Figure 2A:
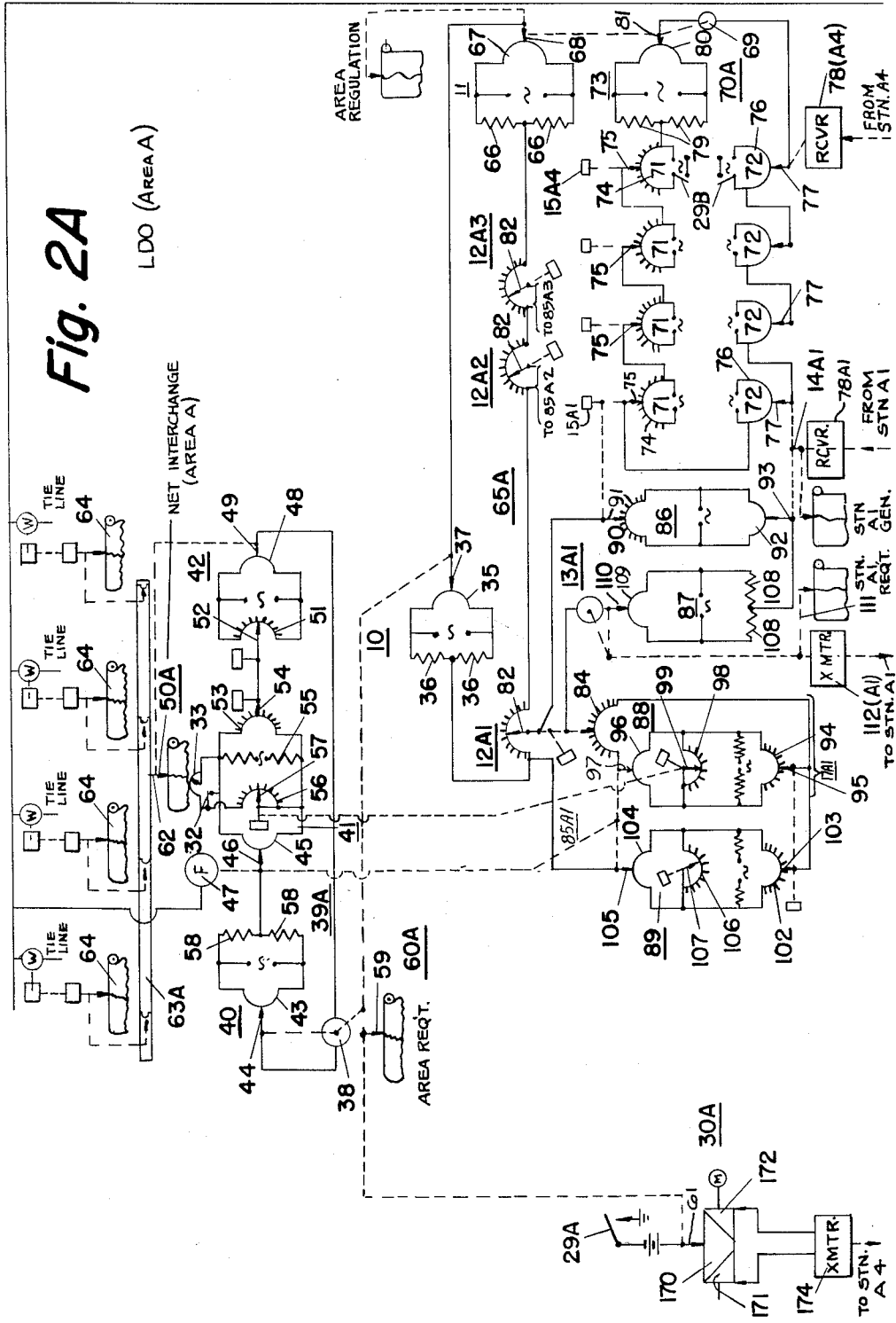

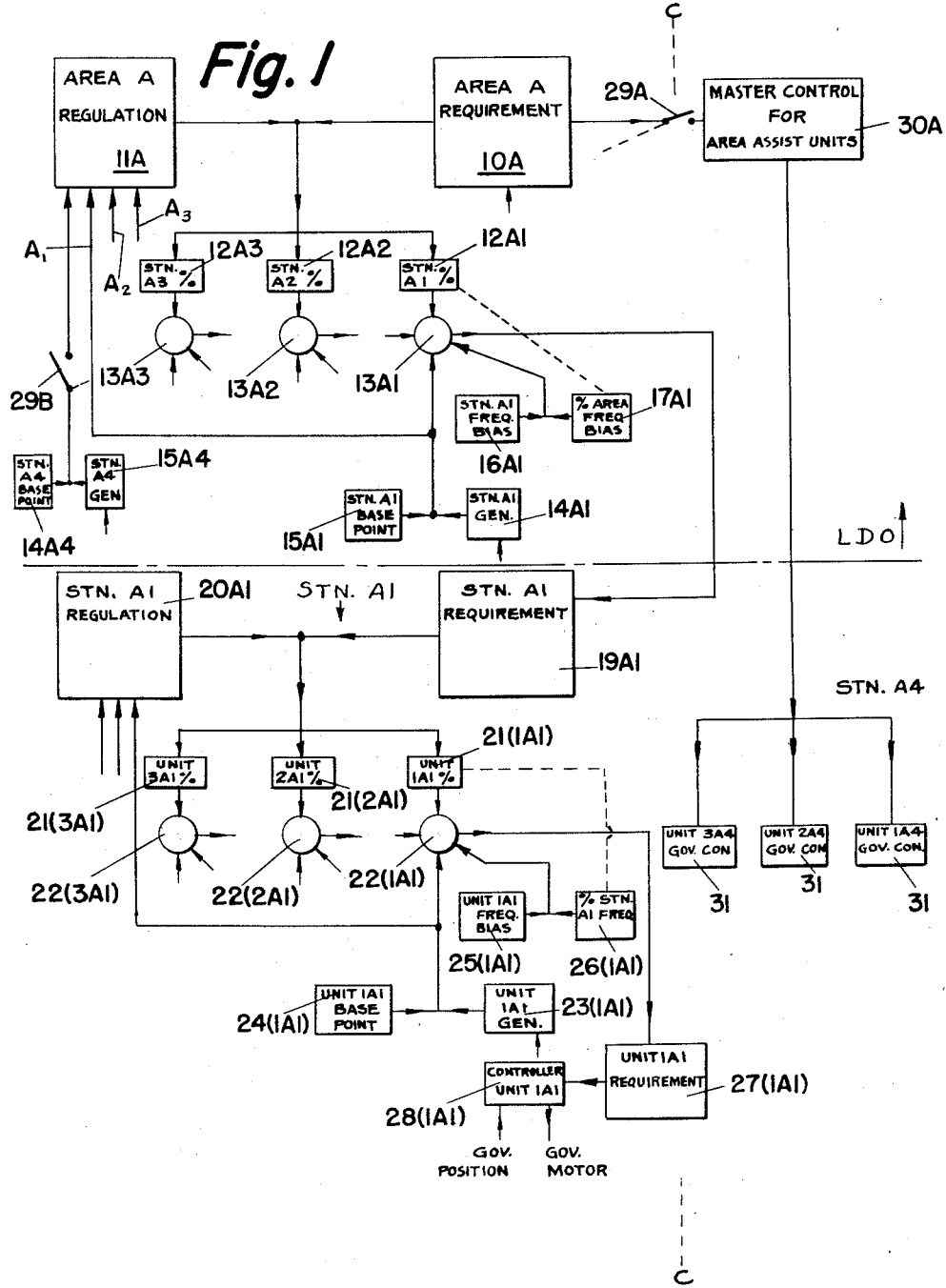

Dec. 23, 1958 N. COHN 2,866,102
SYSTEMS FOR COMPUTING AND CONTROLLING THE
GENERATION OF INTERCONNECTED SOURCES
Original Filed March 26, 1953 13 Sheets-Sheet 8

*Fig. 6A*

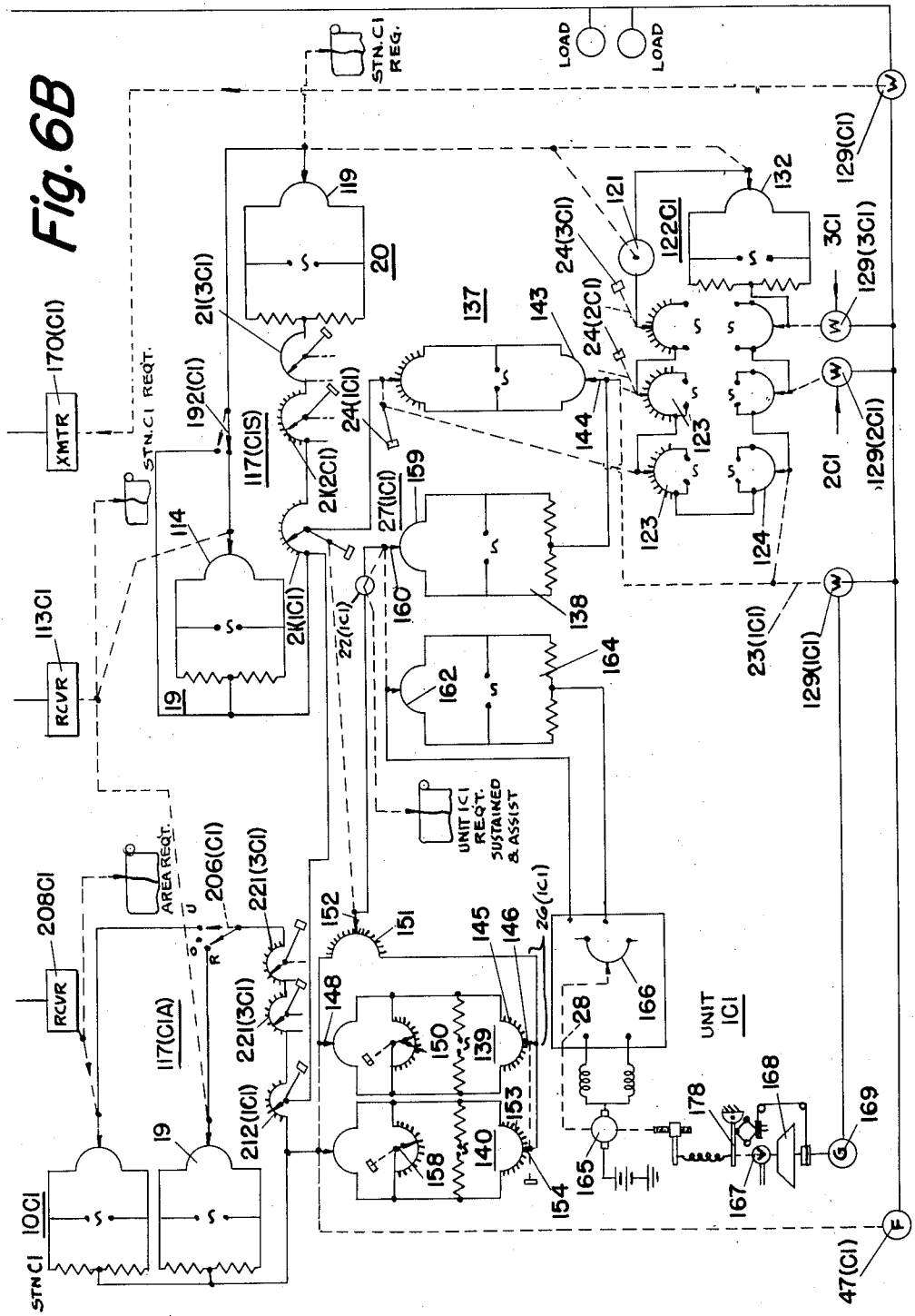

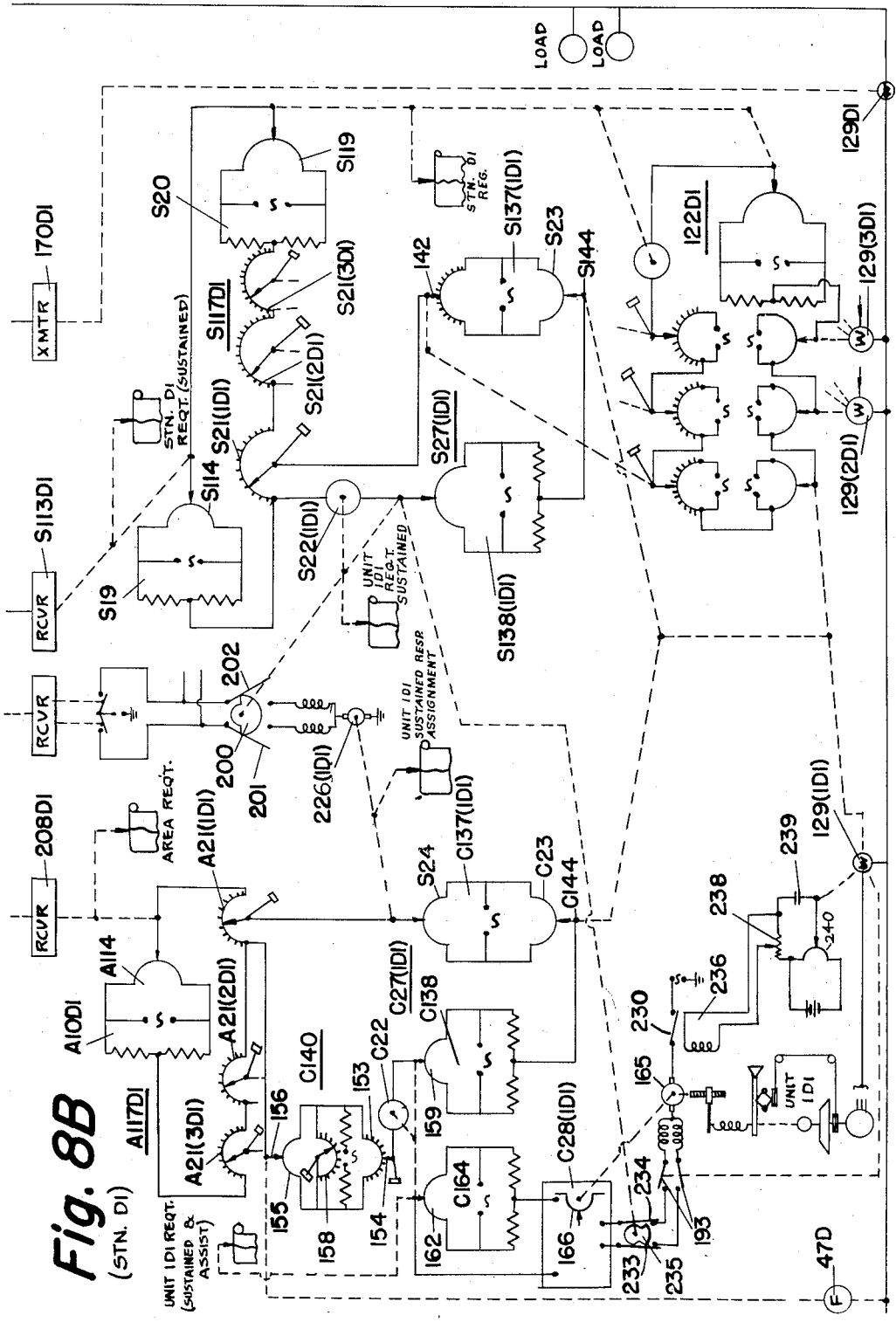

United States Patent Office 2,866,102
Patented Dec. 23, 1958

2,866,102

SYSTEMS FOR COMPUTING AND CONTROLLING THE GENERATION OF INTERCONNECTED SOURCES

Nathan Cohn, Jenkintown, Pa., assignor to Leeds and Northrup Company, Philadelphia, Pa., a corporation of Pennsylvania Continuation of application Serial No. 344,838, March 26, 1953. This application September 11, 1956, Serial No. 609,111

45 Claims. (Cl. 307—57)

This invention relates to the computation and control of the generation of stations and units of a generating area which is interconnected for interchange of power with one or more other areas of a distribution network. For brevity, the term "generating source" as hereinafter used is generic to stations or units.

In various of its features, the present invention is generically similar to that disclosed and claimed in my copending application Serial No. 344,838 upon which was issued Letters Patent No. 2,773,994. In that application, there are disclosed arrangements for computing and controlling the generation of stations and units of a local area so that they participate in accordance with predetermined programing in the total prevailing generation of the area and in the generation changes required of the area to correct deviations from a scheduled interchange of power.

However, all of the arrangements herein disclosed differ therefrom in that the computation of station and unit requirements involve assigned frequency-bias factors which compensate in the computations or exclude therefrom, the effect of normal governor response to system frequency changes. Thus both the station and unit requirement recorders or controllers remain at zero despite governor responses to remote load changes and depart from zero only for local load changes.

When, as in all of the arrangements herein disclosed, the computation of station (or unit) requirement involves a feedback signal related to station (or unit) generation, the novel bias introduced in accordance with the present invention will include at least one factor: i. e., the frequency-bias which corresponds with either the natural or the desired frequency response of the station (or unit). When, as in some arrangements herein disclosed, the computation of station (or unit) requirement additionally involves a signal related to total area (or station) generation, then the novel bias should include an additional factor, i. e., a frequency-bias which is a preset percent of the area (or station) frequency-bias, the percentage numerically corresponding with the assigned percent participation in the area (or station) regulation of the particular stations (or unit).

The introduction of such factors at station or unit level affords a more precise computation of station and unit requirements upon occurrence of remote or local load changes because of compensation in the computation for the effect of the natural governing responses of the individual stations and units. Thus, when such computations are used for mandatory control as distinguished from permissive control, as later more fully discussed, with systems involving feedback related to station or unit output, the control has the advantageous characteristic of not opposing the natural governing response of the station or unit but indeed may selectively predetermine the governing characteristic of the station or unit to modify or replace that of the usual speed-governor.

Figure 2B:
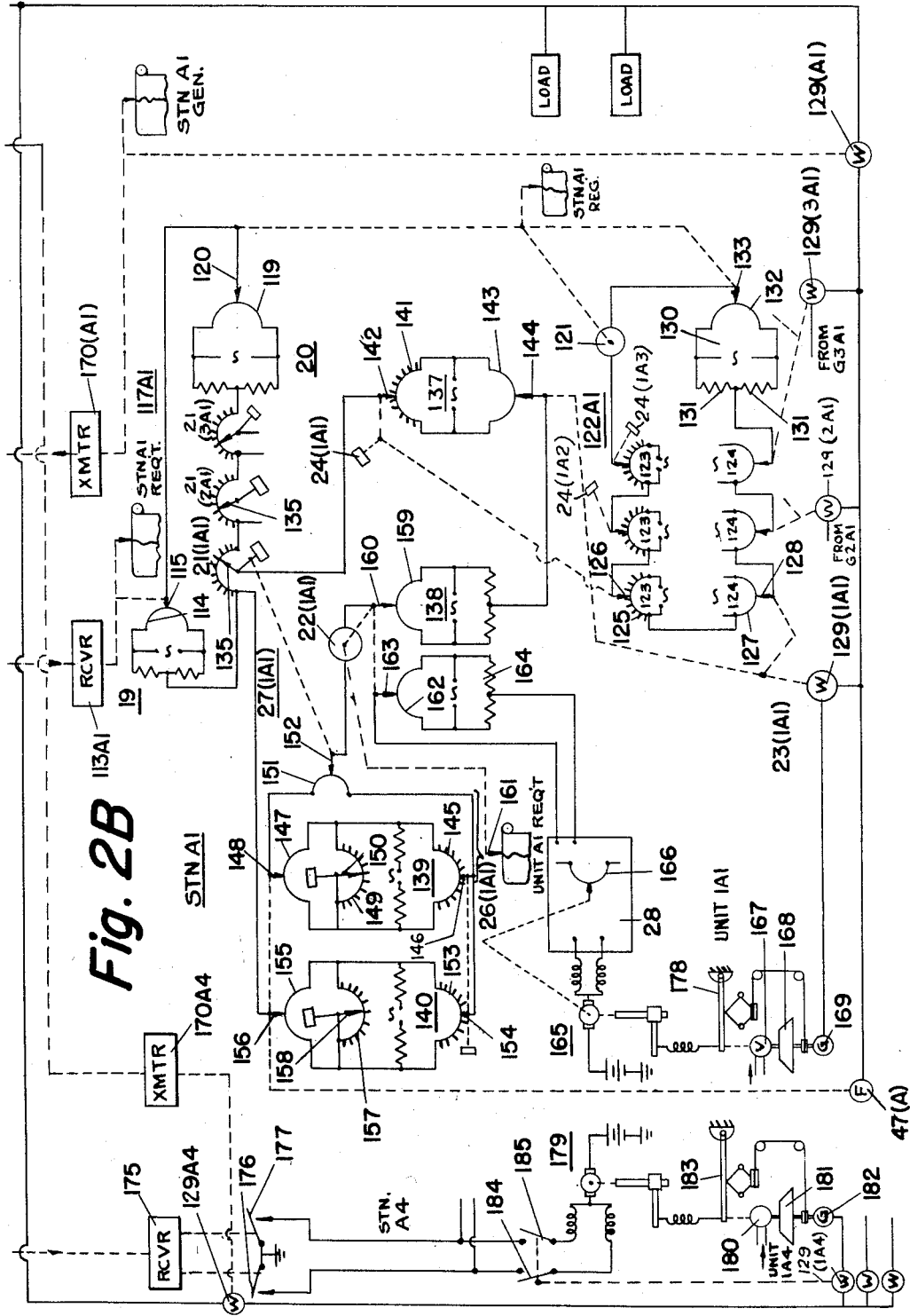
Figure 3:
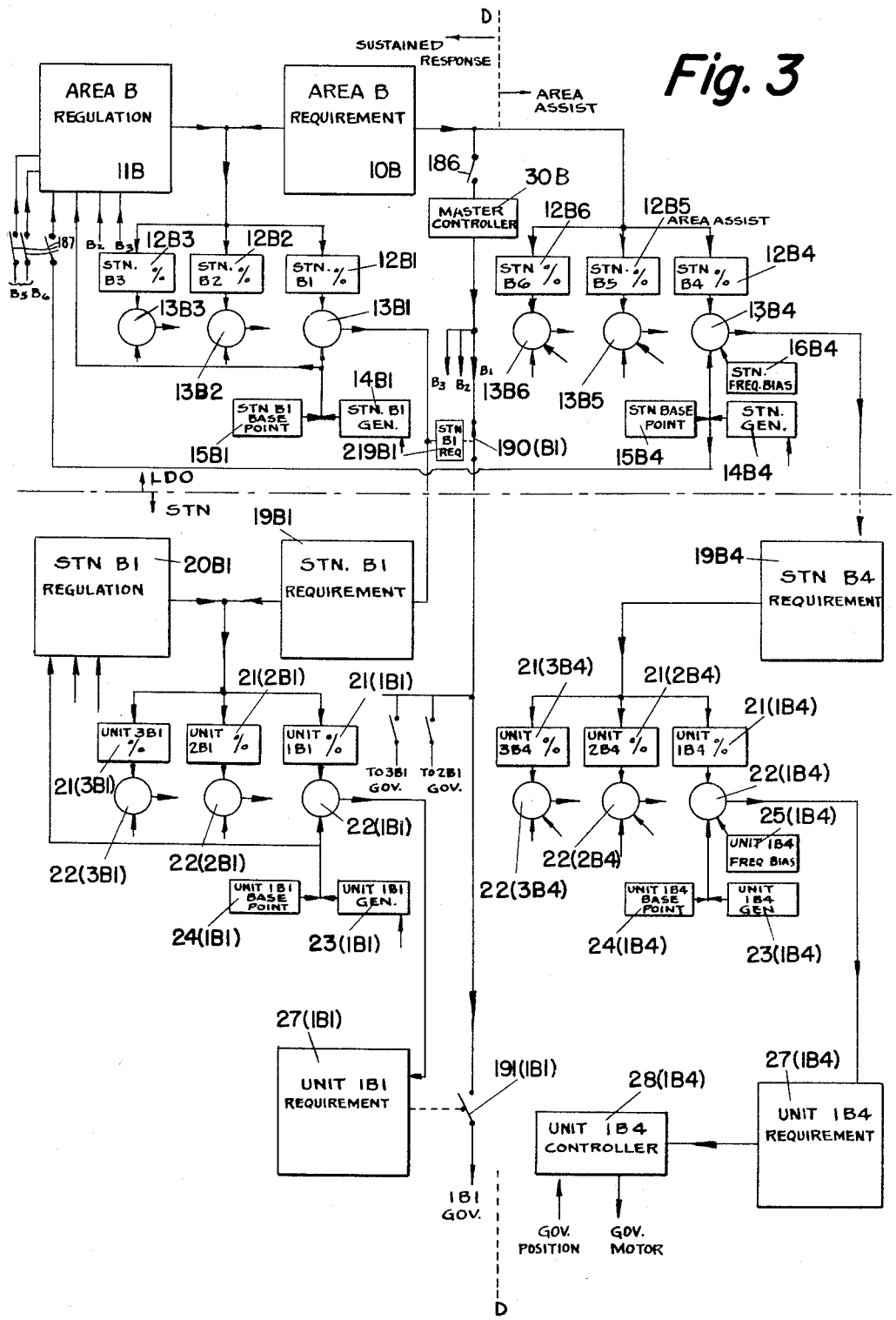
Figure 4A:
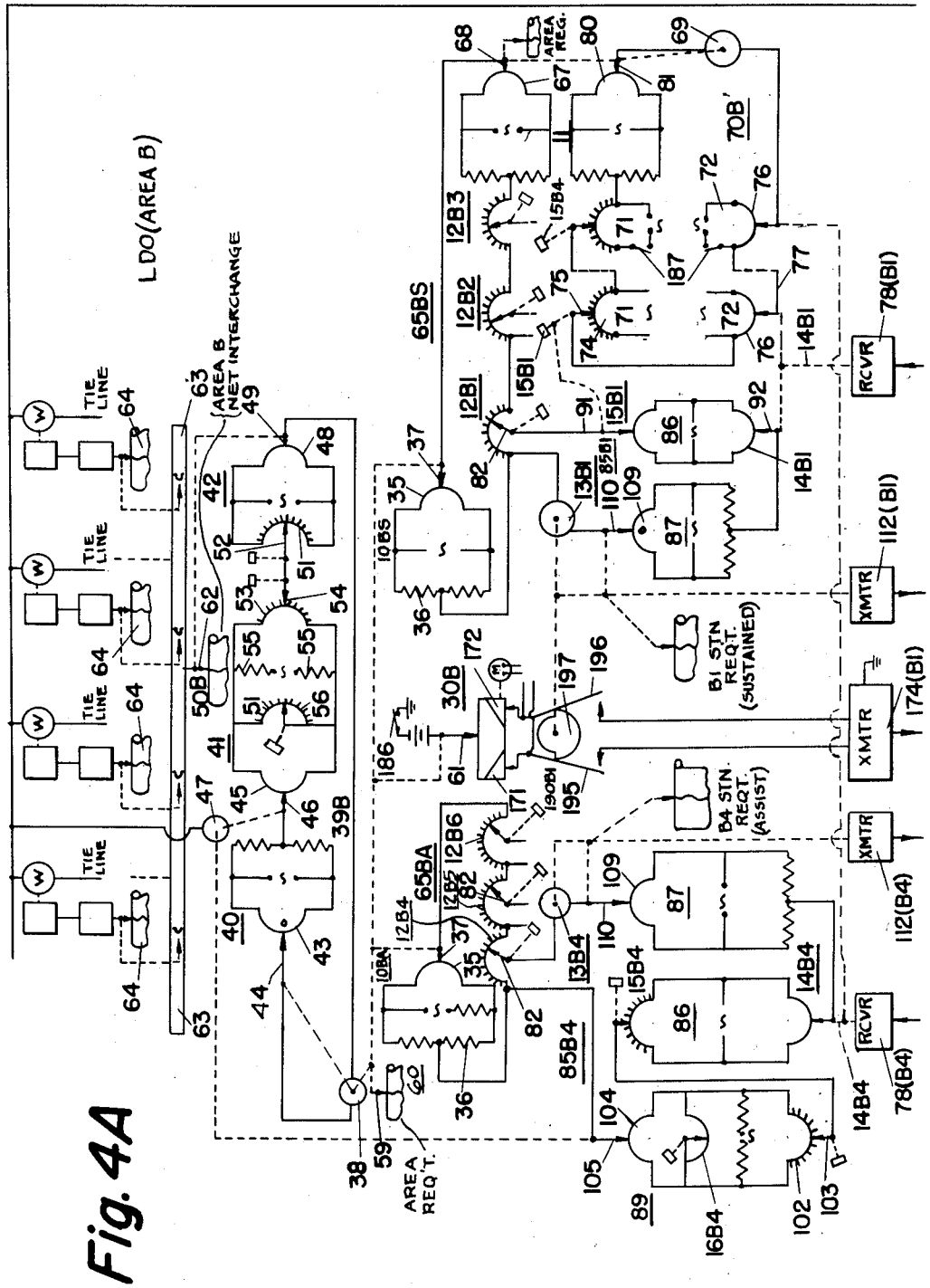
Figure 4B:
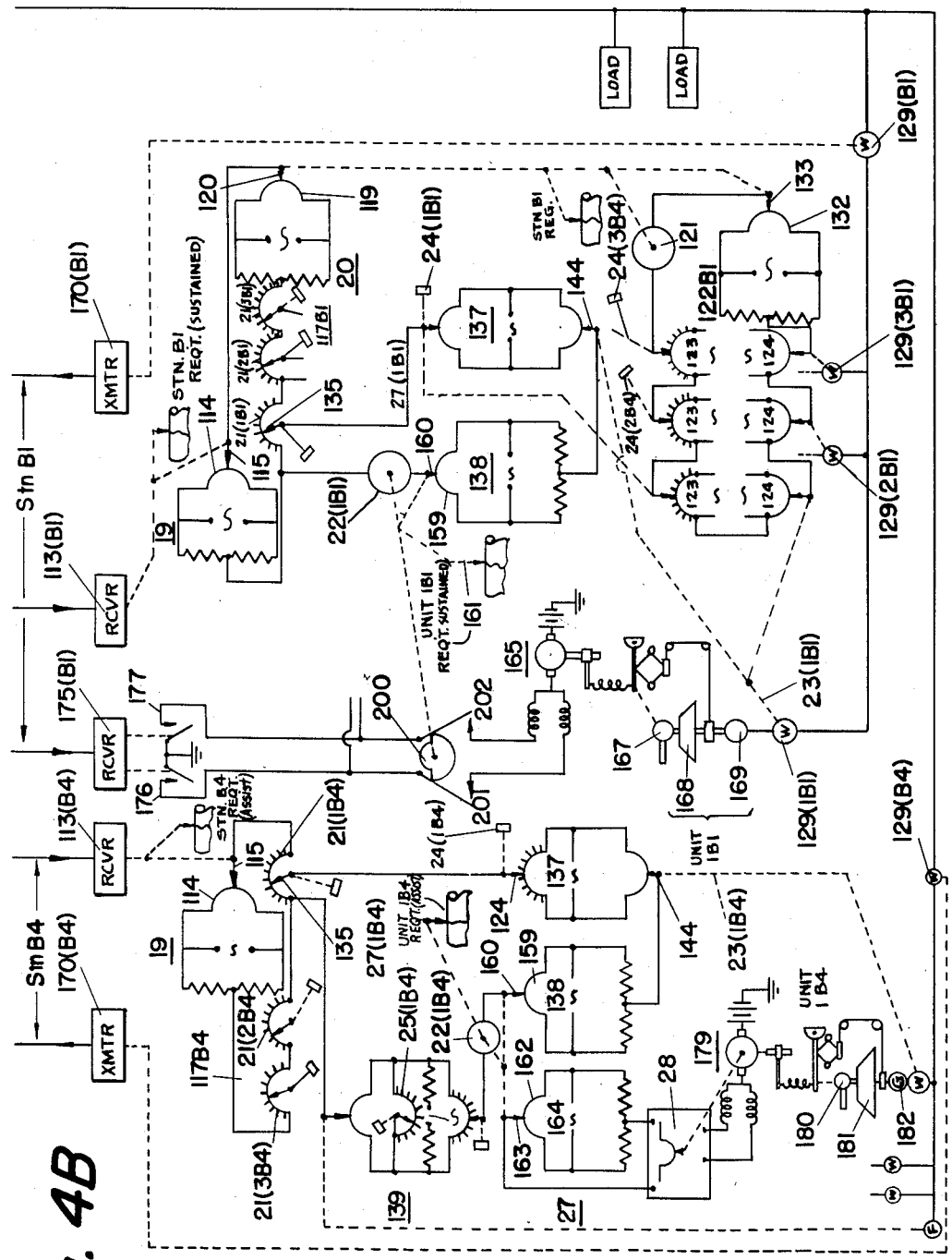
Figure 5:
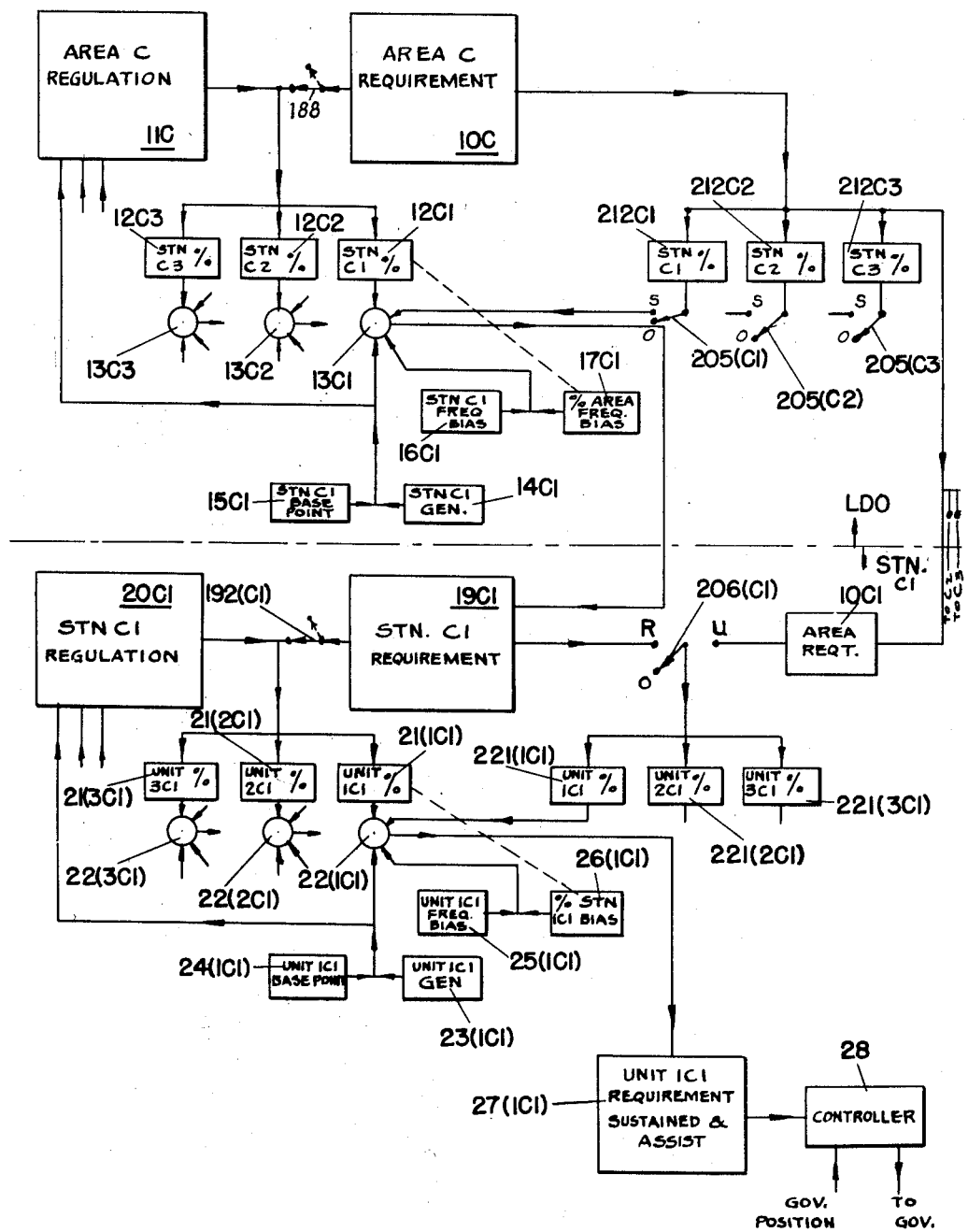
Figure 7:
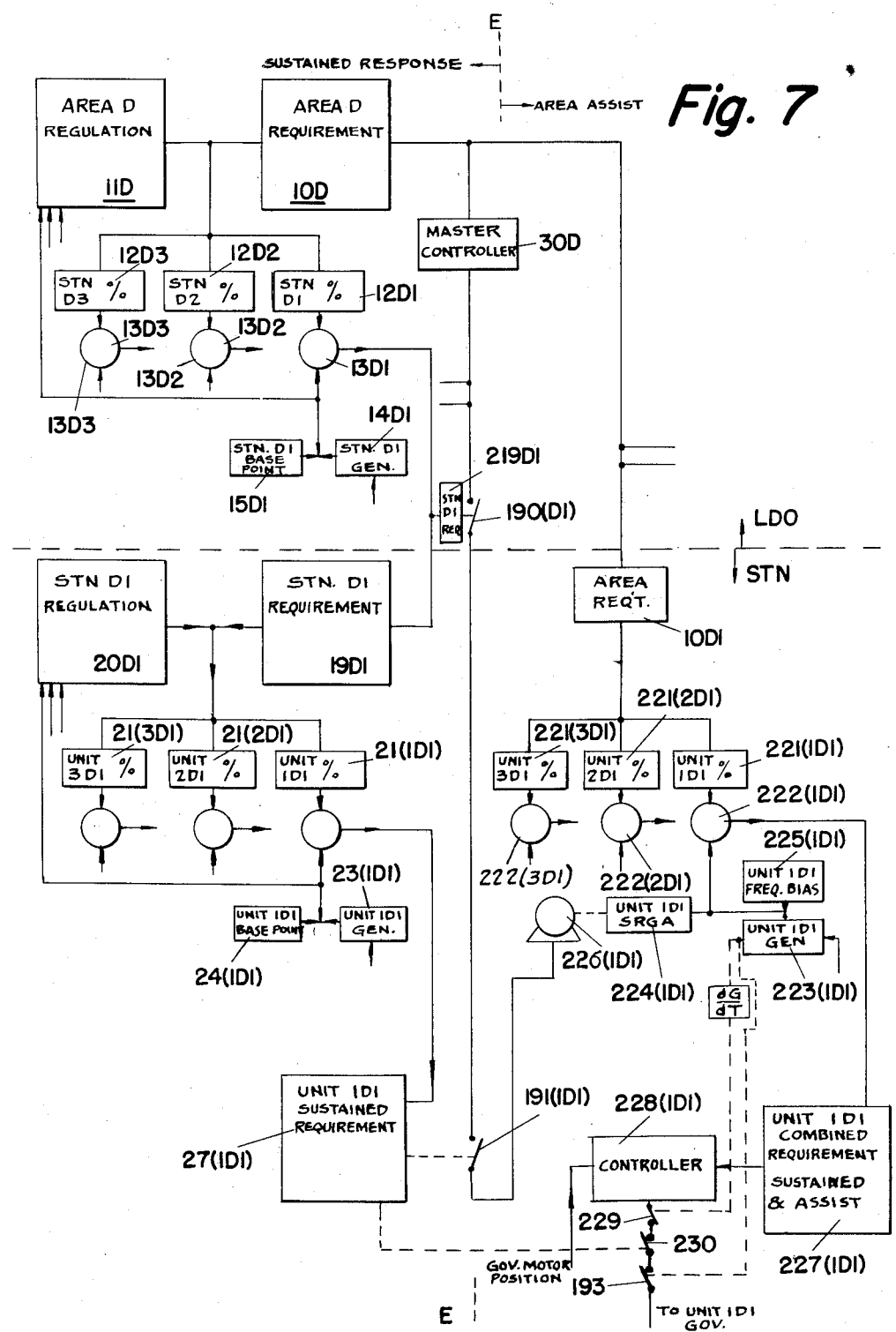
Figure 8A:
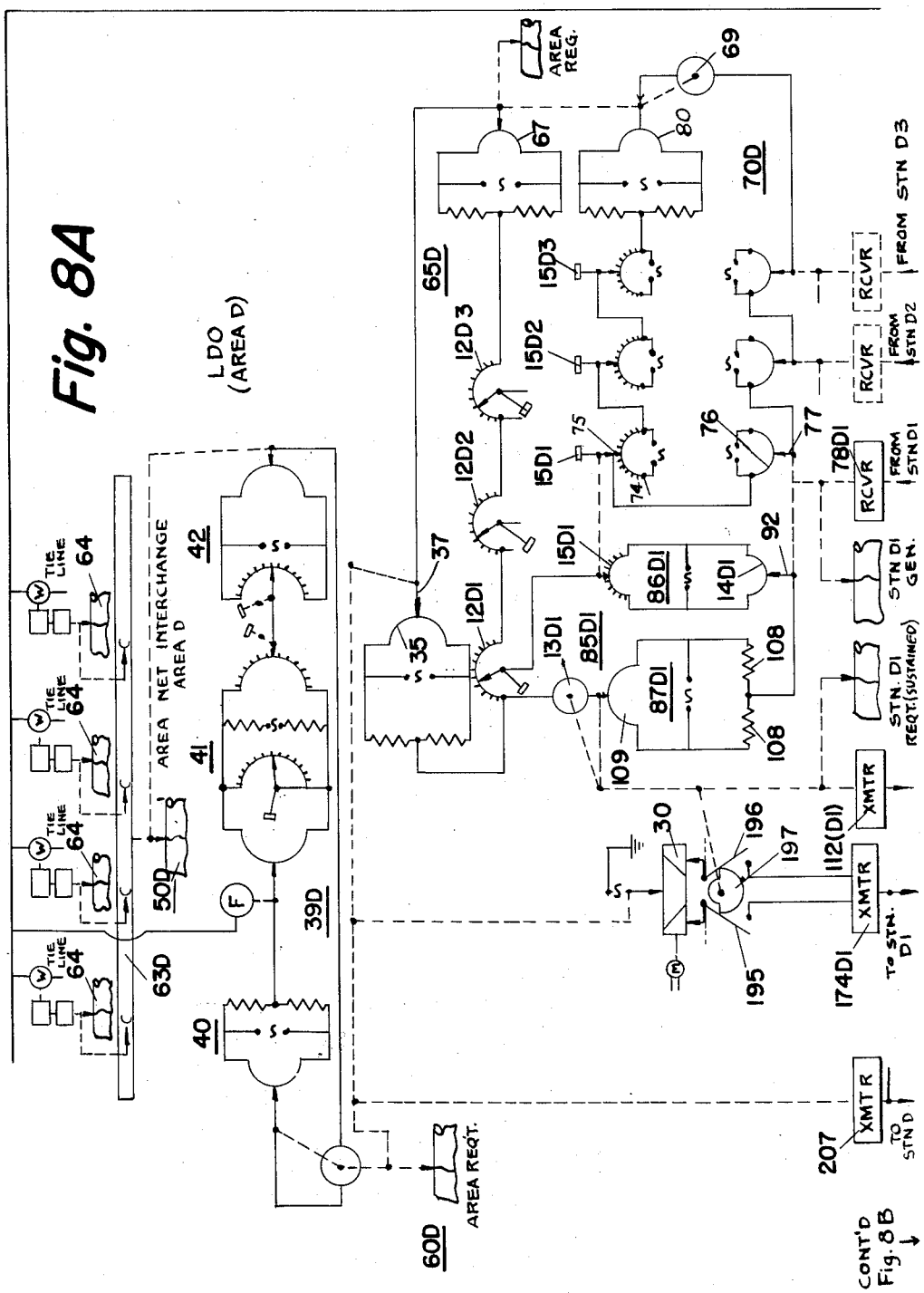

For a more complete understanding of the invention, reference is made to the accompanying drawings, in which:

Fig. 1 is a block diagram of a system for controlling the generation of the stations and units of a generating area in accordance with the invention;

Figs. 2A and 2B jointly disclose a particular embodiment of the system of Fig. 1; Figs 2A and 2B respectively showing the control circuit components disposed at the load dispatcher's office of the area and at one of the stations of the area;

Fig. 3 is a block diagram of a second system for controlling the generation of the stations and units of an area in accordance with the invention;

Figs. 4A and 4B jointly disclosed a particular embodiment of the system of Fig. 3; Figs. 4A and 4B respectively showing the control circuit components disposed at the load dispatcher's office and at one of the stations of the area;

Fig. 5 is a block diagram of a third system for controlling the generation of the stations and units of an area in accordance with the invention;

Figs. 6A and 6B jointly disclose a particular embodiment of the system of Fig. 5; Figs. 6A and 6B respectively showing the control circuit components disposed at the load dispatcher's office and at one of the stations of the area;

Fig. 7 is a block diagram of a fourth system for controlling the generation of the stations and units of an area in accordance with the invention;

Figs. 8A and 8B jointly disclose a particular embodiment of the system of Fig. 7; Figs. 8A and 8B respectively showing the control circuit components disposed at the load dispatcher's office of the area and at one of the stations of the area; and Figs. 9A–9D are explanatory figures referred to in discussion of the computer and control systems of preceding figures.

In simplified block diagram form, Fig. 1 illustrates the principal components and interconnections of a control system for stations and units of area A having tieline connections to one or more other areas of a power-distributing system. The block 10A is generically illustrative of a network or device for producing a signal representative of the "area requirement" which may be defined as the difference between the scheduled and actual net interchange of power at the existing frequency between the local generating area A and the other or foreign generating areas. The scheduled net interchange at various frequencies involves, as later discussed, an area-bias factor usually set to match the natural governing characteristic of the area so that the area-requirement remains on zero for remote load changes. The block 11A is generically illustrative of a network or device for producing a signal representative of the "area regulation" which may be defined as the difference between the summation of the generations of the stations of area A and the summation of the basepoint generation setting of those stations. The area regulation is related to total area generation and is equal to it when basepoint setters are omitted or set to zero. As more fully discussed in my aforesaid application, the algebraic summation of these two signals provides a reference signal in sense and magnitude continuously corresponding with the total generation required of the area to maintain it on schedule.

By the participation setters 12A1–12A3, selected fractions or percentages of the total reference signal are derived for control of the corresponding individual stations A1–A3 of area A. For control of the generation of station A1, for example, the output signal of participation setter 12A1 is compared by a network or device 13A1 with the resultant of signals respectively corresponding with the actual generation of station A1 as produced by device 14A1; with the preset basepoint of station A1 as produced by device 15A1; with the preset frequency-bias for station A1 as produced by device 16A1; and with a percentage of area frequency-bias as produced by device 17A1 and corresponding with the setting of participation setter 12A1. The output signal of comparator 13A1 is representative of the station requirement for station A1, i. e., the change in generation required of station A1 to meet its proportionate share of the total prevailing generation of the area plus its share of the generation required of the area to meet its schedule.

Signals respectively representative of the station requirements for the other stations A2, A3 of area A are similarly derived from the participation setters 12A2, 12A3, comparators 13A2, 13A3 and associated devices (not shown) corresponding with devices 14A1–17A1.

The station-requirement signals may be utilized, as in manner later specifically described, automatically to control the generation of the respective stations A1–A3.

The significance of the addition of the station frequency-bias factor and a percentage of the area frequency-bias factor in the computation of station requirement can perhaps be best illustrated by a specific numerical example. Without these factors, the station requirement ($\Delta G$) may be expressed as (1) $$\Delta G = (B-G) + \frac{P}{100}(N+T)$$

where $B$ = station basepoint
$G$ = station generation
$N$ = area regulation
$T$ = area requirement
$P$ = station percent participation setting It is assumed, as initial conditions, that the station A1 is operating at its basepoint setting of 50 megawatts, that its participation setting is 40%, and that the area regulation and area requirement are both zero. The initial station requirement is also zero as will be seen by substituting these values in Equation 1.

It is now assumed that the area frequency-bias is set to 100 megawatts per 0.1 cycle (the natural governing characteristic of the area), that the prevailing natural governing characteristic of station A1 is 25 megawatts per 0.1 cycle, and that, due to a sudden load change in a foreign area, the frequency drops by 0.1 cycle. Because of the frequency drop, area A by governing action picks up 100 megawatts, i. e., area regulation now reads 100. Because the area bias setting matches the natural governing characteristic of the area, the area requirement remains at zero. The generation of station A1 increases to 75 megawatts because of its governing response to the frequency drop. By substitution in Equation 1, the computed station requirement for station A1 is shown below to be 15 megawatts positive:

(1A) $$\Delta G = (50-75) + \frac{40}{100}(100+0) = +15$$

Thus although station A1 has, due to governing action, taken on a 25 megawatt load due to load change in the foreign area, the computed station requirement indicates it should pick up an additional 15 megawatts contrary to the desirable objective that the generation changes in the local area should be limited, upon occurrence of load changes in a remote area, to the natural governing action. In the foregoing example, wherein the percent participation for station A1 was higher than the ratio of the station governing characteristic to the area governing characteristic, the computed station requirement was positive, i. e., calling for station generation in addition to governor response. Had the percent participation been selected to be smaller than such ratio, the computed station requirement would be negative, i. e., in sense opposing the governing contribution of the station. For example, under the same conditions and assumptions as above except that the participation setting for station A1 is 10%, the computed station requirement as shown below is 15 megawatts negative:

(1B) $$\Delta G = (50-75) + \frac{10}{100}(100+0) = -15$$

When the computed station requirement is utilized for mandatory control of station generation (control action initiated upon existence of station requirement and persisting until station requirement is zero), the generation changes demanded by the computation of Equations 1A, 1B are not desirable and result in unnecessary and uneconomic generation shifts. Neither matches governing response, and both demand further control, in one case forcing generation beyond governor response and in the other case rejecting the governing response, wholly or in part.

With the frequency-bias factors added, as in Fig. 1, this situation is corrected. Now the computed station requirement ($\Delta G$) may be expressed as (2) $$\Delta G = (B-G) + \frac{P}{100}(N+T) - \Delta F\left(K - \frac{PL}{100}\right)$$

where $K$ = station bias per one-tenth cycle,
$L$ = area bias per one-tenth cycle, and
$\Delta F$ = frequency deviation in tenths cycle (minus for frequency drop).

Assuming the same initial conditions as before, and with the station-bias factor set at 25 megawatts per one-tenth cycle to match its natural governing characteristic, the same frequency drop (0.1 cycle) due to change of load in a foreign area gives, as shown below, for a participation setting of 40% a computed station requirement of zero.

(2A)
$$\Delta G = (50-75) + \frac{40}{100}(100+0) + 1.\left(25 - \frac{40}{100}\cdot 100\right) = 0$$

Similarly, with a participation setting of 10%, the computed station requirement is also zero:

(2B)
$$\Delta G = (50-75) + \frac{10}{100}(100+0) + 1\left(25 - \frac{10}{100}\cdot 100\right) = 0$$

From the foregoing, it will be understood that with such introduction of frequency-bias factors for the station, the change in station generation resulting from response of the speed governors of the generating units of that station to a remote load change can persist without causing a station-requirement demanding additional control action. Otherwise stated, the inherent action of the local governors in helping to check a frequency change is not opposed or enhanced by a control based on station requirement so computed.

In actual practice, the inherent governing characteristic of a station may be variable and hence cannot be matched throughout the generation range of the station by a preset station frequency-bias. This, however, creates no operating difficulty or limitation because then the control action based on Equation 2 to reduce $\Delta G$ to zero corrects any mismatch, imposing upon the station a desired frequency-responsive characteristic which is defined by the setting of station frequency-bias. In fact, the unit speed-governors of a station may be set with a steep droop, or otherwise set to be unresponsive to normal frequency changes, and retained only for emergency overspeed protection; in such case, the control based on Equation 2 and with generation adjusted until $\Delta G$ is zero, effectively assigns to the station a preselected frequency-governing characteristic effective over the full operating range and free of the usual disadvantages and vagaries of speed governors including deadband, sluggishness, insensitivity, sharp changes of incremental slope, and general wear and change of calibration with time, temperature and other variables.

The station frequency-bias may thus be set to a value other than the inherent frequency response of the station, in which case the station frequency-bias will be the determining factor in establishing the frequency response of the station. When, as later described, the computation of station requirement for mandatory control involves area requirement but does not involve area regulation, then the percent area frequency-bias factor is omitted and Equation 2 becomes $$(3) \quad \Delta G = (B-G) + \frac{P}{100}T - \Delta FK$$

The retention of the station frequency-bias factor K provides the desired frequency-response characteristic of the station. In Equation 2, area bias, L, may be set to zero in which case also the frequency bias term reduces to $-\Delta FK$.

The computed station requirements as represented by the outputs from comparators 13A1—13A3 are respectively transmitted to the corresponding stations of the area and are there utilized for control of generating units of the respective stations. Specifically and as schematically illustrated in Fig. 1, the requirement signal for station A1 is utilized to control the generation of units 1A1—3A1 of that station so that they participate to predetermined programming in the generation change required of station A1 to meet its share of the area requirement.

At station A1, its computed requirement signal is reproduced as the output signal of a suitable network or device represented by block 19A1. The block 20A1 is generically representative of a network or device for producing a signal representation of "station regulation" which may be defined as the difference between the summation of the generation of the units of station A1 and the summation of the basepoint settings of those units. The station regulation is related to total station generation and is equal to it when the unit basepoint setters are omitted or set to zero. The algebraic summation of these two signals (station-requirement and station-regulation) provides, as more fully discussed in my aforesaid application, a reference signal corresponding with the total generation required of the station to supply its programmed share of the total area generation required to maintain the area on its schedule.

By the participation setters 21(1A1)—21(3A1), selected fractions or percentages of this reference signal are derived for control of the corresponding units 1A1—3A1 of station A1. The output signal of participation setter 21(1A1) is compared by a network or device 22(1A1) with the resultant of signals respectively corresponding with the actual generation of unit 1A1, the preset basepoint generation of unit 1A1, the preset frequency-bias for unit 1A1, and a percent of the station frequency-bias corresponding with the setting of the station frequency-bias setter 16A1. These latter signals are respectively produced by the devices or networks 23—26 of the corresponding generator unit 1A1. The output signal of comparator 22(1A1) is representative of the "unit requirement" for generating unit 1A1: i. e., the change in generation required of unit 1A1 to meet its programmed share of station A1's total generation and generation requirement.

Signals respectively representative of the unit requirements for each of the other units 2A1—3A1 of station A1 are similarly derived from the participation setters 21(TA1), 21(3A1), comparators 22(2A1) and 22(3A1).

The respective unit-requirement signals may be reproduced for automatic control of the generation of the corresponding units as by control of the input valves or gates of vapor or hydraulic prime movers respectively or by control of the rate of vapor generation of their supply sources including nuclear powered sources. In the particular arrangement schematically illustrated in Fig. 1, the governor motor controller 28(1A1) for unit 1A1 is responsive to the unit-requirement signal reproduced by device 27(1A1).

By addition of and proper setting of the unit frequency-bias factor and of the percent station-bias factor in the computation of a unit requirement, the change in generation of the unit resulting from response of its speed governor to a remote load change can persist without appearing as a unit requirement demanding corrective control action. The inherent action of the governor in responding to a frequency change caused by a remote load change is not opposed by a control based on the computed unit requirement. For the reasons above discussed in connection with matching of station-frequency bias to station-frequency characteristic, it may not be possible to match the unit-frequency bias to the natural governing characteristic of the unit throughout the generation range of the unit. In this case also, the control action corrects the mismatch.

The computed unit requirement $\Delta G'$ for the arrangement disclosed in Fig. 1 may be expressed $$(4) \quad \Delta G' = (B'-G') + \frac{P'}{100}(N'+\Delta G) - \Delta F\left(K' - \frac{P'K}{100}\right)$$

where $B'$=unit basepoint
$G'$=unit generation
$P'$=unit percent participation
$N'$=station regulation
$\Delta G$=station requirement (see Equation 2)
$\Delta F$=frequency deviation in tenths cycle (minus for drop in frequency)
$K'$=unit bias per one-tenth cycle
$K$=station bias per one-tenth cycle With a control based on Equation 4 for adjustment of unit generation until $\Delta G'$ becomes zero and with the unit frequency-bias set to a value different from the natural governor response, the unit frequency-bias will be the determining factor in establishing the frequency response of the generating unit.

When, as later discussed, the computation of unit requirement for mandatory control involves area requirement but not area or station regulation then the percent station-frequency-bias factor may be omitted. The retention of the unit frequency-bias factor then provides the desired frequency response characteristic of the unit.

In the system of Fig. 1 as thus far described, i. e., the portion to the left of line C—C, the control of the generating stations provides for each of them on occurrence of a local load change, an initial generation assignment (from an area requirement effect) which is identical to its sustained requirement (from area regulation effect). This is because for each station there is a common percentage taken for both effects by the respective participation setters 12A1—12A3. As a result, the generation changes are assigned to the stations which are to retain them so long as the local load remains at the new value. Similarly, at the station, since for each unit there is taken a common percentage of the station regulation and station requirement effects, the initial and sustained generation assignments to individual units are equal. As a result, the generation changes are assigned to the units which retain them so long as the local load remains at the new value. The stations and units controlled as above described are hereinafter termed "sustained-response" stations and units. Sustained response control suffices so long as the generating sources are capable of changing their generation at a rate at least equal to the rate of change of customer demand. If such capability is exceeded and it is desired not to depart from the area tie-line interchange schedule, there is provided temporary regulating assistance, hereinafter termed "area-assist," from other generating sources in the area.

In Fig. 1, to the right of line C—C, there is shown one way of providing an area assist action by station A4 having generating units 1A4—3A4. With switch 29A closed, area-assist units 1A4—3A4 are directly controlled from master controller 30A through their respective governor controllers 31. Throughout the period for which an area requirement exits, the master controller produces "Raise" or "Lower" pulses which for that period are effective progressively to change the governor settings of the area-assist units in corrective sense. This is in contrast to the control of the sustained response units in which, as above explained, the change in governor setting of each unit is terminated when its own unit requirement ($\Delta G'$) is zero even though some area requirement may still exist.

As schematically illustrated in Fig. 1, the basepoint generation and the actual generation of area-assist station A4 are introduced, with switch 29B closed, by devices 14A4 and 15A4 into computer 11A which determines the regulation of area A. Thus, the changes in generation assumed by the area assist station A4 above or below its basepoint setting, are ultimately transferred to the sustained response stations because the latter are subject to mandatory control continuing until $\Delta G'$ of each of the sustained response units is zero.

For convenience, the switches 29A, 29B are ganged. With these closed, the system of Fig. 1 includes the above-described area-assist action of station A4.

Figs. 2A–2B illustrate, as combined, a particular example of the computer control system of Fig. 1 as utilized for full automatic control of generating stations and units of an area. Fig. 2A illustrates the networks and devices disposed at the load-dispatchers office of an area for determining the various station requirements and for producing signals transmitted to the various stations to demand change of their generations. Fig. 2B illustrates the networks and devices utilized at one of the stations of the area for determining the requirements of its sustained response units and for controlling them, and those utilized at another of the stations to provide for its area-assist control.

In the following descriptions, whenever reference is made to the positioning of a slidewire or of a slidewire contact it will be understood that either the contact or the slidewire may be the adjustable element.

Referring to Fig. 2A, the network 10 for producing a signal voltage representative of an existing area requirement is a split potentiometer or bridge including a slidewire 35, fixed resistors 36 and a suitable supply source. The position of contact 37 relative to slidewire 35 is adjusted by rebalancing device 38 of a computer network 39A so that the output of network 10 corresponds with the existing requirement of area A as computed by network 39A.

The computer network 39A includes three component networks 40, 41, 42 having individual supply sources and respectively including the rebalancing slidewire 43 whose contact 44 is adjustable by responsive device 38; the slidewire 45 whose contact 46 is adjustable by the frequency-meter or recorder 47, and the slidewire 48 whose contact 49 is adjustable by the area net-interchange meter or recorder 50A. The supply sources for component networks 40, 41, 42, as well as for component networks of this and all other computer networks, are electrically isolated though the supplies may be derived from a common current supply source. The ultimate source may be of the alternating or direct-current type. In all cases, the supply voltages of the component networks of a computer network must be individually fixed or all vary together in the same ratio.

The positioning of contact 49 of slidewire 48 of network 42 can be effected by any arrangement which totalizes the net-interchange between the area A and the rest of the system. For example, contact 49 may be coupled to the exhibiting element 62 of the net-interchange meter or recorder 50A responsive to the output of the summation network exemplified by block 63A and including slidewires respectively positioned by tie-line meters or recorders 64 effectively connected through telemetric links to tie-line interchange points of the area.

The component network 42 also includes a slidewire 51 whose contact 52 is manually set to a position corresponding with the scheduled net-interchange of power between area A and the rest of the power-distribution system. Thus, when the actual net-interchange is at the value scheduled for normal system frequency, the output voltage of network 42 is zero. If the actual interchange departs from this value, the output voltage of network 42, because of the resulting displacement of contact 49, corresponds in sense and magnitude with such deviation.

The component network 41 additionally includes a slidewire 53 whose contact 54 is manually set to a position corresponding with the normal system frequency agreed upon. Thus, when the actual system frequency is at normal value, the output signal voltage of network 41 is zero. If the system frequency departs from normal, the output voltage of network 41, because of the resulting displacement of contact 46, corresponds in sense and magnitude with such frequency deviation. To preset the extent to which the scheduled interchange varies with actual system frequency (i. e., area-frequency bias) the network 41 additionally includes the fixed resistors 55, 55 in series between the supply source of the network and slidewires 45, 53; and the slidewire 56 whose contact 57 is manually set in accordance with the agreed frequency-bias for the area. The setting of contact 57 therefore determines the extent to which the output of network 41 changes for any given deviation from the preset normal frequency. In the foregoing, it is assumed that switch 32 is closed to short-circuit slidewire 33 whose purpose is later discussed.

The output voltages of component networks 41, 42 are combined so that the resultant is at all times representative of the area requirement. When this resultant is not equal and opposite to the output of the third component network 40, the responsive device 38 adjusts the contact 44 of slidewire 43 until balance of the computer network 39A is obtained. Thus, the relative position of contact 44 and its slidewire 43 corresponds with an existing area requirement.

Concurrently with its rebalancing of computer network 39A, the responsive device 38 also correspondingly positions the slidewire contact 37 of network 10, the exhibiting element 59 of the area-requirement meter 60A and the contact 61 of master controller 30A.

From the foregoing, it will be understood that the output voltage of network 10 at all times corresponds with the existing area requirement (T, Equation 2) of area A and involves tie-line interchange, frequency and frequency-bias factors. It may include additional factors such as disclosed in my copending application S. N. 693,589.

Network 65A, which includes network 10 as one of its components, also includes network 11 whose output voltage is representative of area regulation. Network 11 is a split potentiometer or bridge including fixed resistors, 66, 66 and a slidewire 67 whose contact 68 is positioned to correspond with the computed difference between the summation of the basepoint settings of stations A1—A3 of area A and the summation of the actual generations of those stations. With switches 29B, 29B closed, the computed difference additionally includes the basepoint setting and the actual generation of station A4.

For automatic adjustment of contact 68, it is coupled to the rebalancing device 69 of computer network 70A including a series of network pairs 71, 72 in number corresponding with the stations of the area. Each network 71 includes a slidewire 74 whose contact 75 is manually preset by the associated one of the base-load setters 15A1—15A4 for the desired base-load of the corresponding station. Each network 72 includes a slidewire 76 whose contact 77 is positioned, in accordance with the actual generation of the corresponding station. For station A1, the actuator 14A1 for contact 77 of corresponding network 72 responds to signals received by telemetric receiver 78A1. As indicated, networks 71, 72 are connected in series in computer network 70A so that their resultant output is the summation of the differences between the basepoint settings and actual generations of the controlled stations, i. e., the resultant output corresponds with area regulation.

In computer network 70A the component network 73 for balancing this resultant of the outputs of network pairs 71, 72 is a split potentiometer or bridge including fixed resistors 79, 79 and a slidewire 80 whose contact 81 is adjustable by the unbalance responsive device 69. Since contact 68 of slidewire 67 of network 11 is also repositioned by the responsive device 69, the output of network 11 of computer network 65A corresponds with area regulation (N, Equation 2).

The outputs of component networks 10 and 11 are combined in network 65A to provide a reference signal [(N+T); Equation 2] of sense and magnitude corresponding with the algebraic sum of area requirement and area regulation. Pre-selected percentages of this signal are allocated to the different sustained-response stations A1—A3 predetermine their participation in the total prevailing generation of the area plus the change in generation required of the area to meet the area schedule.

Specifically in Fig. 2A, the participation slidewires 12A1—12A3, in number corresponding with the sustained-response stations of area A, are traversed by a reference current whose sense and magnitude are determined by the algebraic sum of the outputs of component networks 10, 11. The contacts 82 of these slidewires are respectively manually preset in accordance with the desired percentage participations (P, Equation 2) of the corresponding stations. The voltages produced across the selected portions of these station-participation slidewires are respectively introduced into computer networks 85A1—85A3 for determining the respective station requirements and for producing signals transmitted to the individual stations for control of their respective generations.

The station requirement network 85A1 for station A1 is shown and now described. Similar computer networks 85A2, 85A3 are used for the other sustained-response stations of area A. In addition to the station-participation slidewire 12A1, the station requirement network 85A1 includes four series-connected component networks 86—89, each of the split potentiometer or bridge type and each having its own supply source.

The network 86 includes slidewire 90 whose contact 91 is manually set by basepoint setter 15A1 to the desired basepoint (B; Equation 2) of station A1 and a slidewire 92 whose contact 93 is adjustably positioned by actuator 14A1 in accordance with the actual generation (G; Equation 2) of station A1. Thus, the output voltage of network 86 corresponds with the difference between the basepoint setting of station A1 and its actual generation [B—G); Equation 2].

The component network 88 includes the slidewire 94 whose contact 95 is manually preset to correspond with normal system frequency; a slidewire 96 whose contact 97 is adjustably positioned, as by frequency-meter 47, in accordance with actual system frequency; and a slidewire 98 whose contact 99 is manually preset in accordance with the agreed frequency-bias of the area (L, Equation 2). Thus, the output voltage of network 88 as appearing between contacts 95, 97 corresponds with the difference (ΔF; Equation 2) between the normal system frequency and the actual system frequency multiplied by the area frequency-bias setting.

The slidewire 84 connected across the output terminals of frequency-bias network 88 has a contact 100 manually set to the same percentage (P; Equation 2) as the station-participation slidewire 12A1. Thus, the output of network 17A1 as appearing between contact 100 of slidewire 84 and contact 95 of network 88 is the complete percent area frequency bias factor $$\left[\Delta F\left(\frac{P}{100}L\right)\right] \qquad \text{Equation 2}$$

The component network 89 of computer network 85A1 includes slidewire 102 whose contact 103 is manually preset to correspond with normal system frequency; a slidewire 104 whose contact 105 is positioned in accordance with actual system frequency; and a slidewire 106 whose contact 107 is manually preset in accordance with the desired frequency-bias for station A1 (K; Equation 2). Thus, the output voltage of network 89 corresponds with the difference between normal system frequency and actual system frequency multiplied by the station frequency-bias setting: i. e., the output voltage of network 89, corresponding to device 16A1 of Fig. 1, is the complete station frequency-bias factor (ΔFK; Equation 2).

The resultant of the algebraic summation of the voltage across the selected percentage of participation slidewire 12A1, and the output voltages of networks 86, 89, 17A1, is automatically balanced by responsive device 13A1 against the output voltage of network 87. This rebalancing network 87 includes fixed resistors 108, 108 and slidewire 109 whose contact 110 is adjustable by responsive device 13A1 to balance the computer network 85A1.

With the network 85A1 in balance, the positions of contact 110 and the exhibiting element 111 movable therewith each corresponds with the generation requirement for station A (ΔG; Equation 2) taking into account the novel station frequency-bias and the percent area frequency-bias factors.

Because of introduction of these frequency-bias factors in computer network 85A1, any change in generation of station A1, due to response of its unit governors to system-frequency changes, does not appear as an uncompensated factor in the computation of the station requirement and therefore does not demand unnecessary or undesired control action. This is particularly significant for responses to frequency changes resulting from load or generation changes in remote areas and is also significant for local load or generation changes when the generating capacity of the local area is a substantial percentage of the generating capacity of the entire distribution network.

The responsive device 13A1 may also be utilized to control a telemetric transmitter 112(A1) for transmission of a station-requirement signal to station A1. A suitable transmitter arrangement is shown in Phillips Patent 2,754,429. Thus, at station A1, as well as at each of the other stations of area A, the station-requirement signal may be utilized, as now described, to control the generation of individual units of that station.

At station A1, the telemetric receiver 113(A1) (Fig. 2B) adjusts the contact 115 of slidewire 114 of network 19 so that the output voltage of this network corresponds in sense and magnitude with the requirement of station A1 (ΔG; Equation 4) as computed by network 85A1 (Fig. 2A) at the load-dispatcher's office.

Network 117(A1), which includes network 19 as one of its components, also includes network 20 whose output voltage as now explained is representative of station regulation. Network 20, like network 19, is a split potentiometer or bridge having fixed resistors and a slidewire 119 whose contact 120 is adjusted to correspond with the computed difference between the summation of the basepoint settings of units 1A1—3A1 of station A1 and the summation of the actual generations of those units.

For automatic adjustment of contact 120, it may be actuated by the rebalancing device 121 of computer network 122A1 which includes a series of network pairs 123, 124 in number corresponding with the generating units of station A1. Each network 123 includes a slidewire 125 whose adjustable contact 126 is manually preset by unit-basepoint setter to correspond with the desired basepoint of the corresponding generating unit. Each network 124 includes a slidewire 127 whose contact 128 is positioned as by wattmeter 129 in accordance with the actual generation of the corresponding generating unit. Thus, the total output of the pairs of networks 123, 124 is the algebraic summation of the unit basepoint settings and the actual unit generations, i. e., station regulation.

The network 130 for rebalancing the resultant of the outputs of pairs of networks 123, 124 includes fixed resistors 131, 131 and a slidewire 132 whose contact 133 is adjustable by the unbalance responsive device 121. Since contact 120 of slidewire 119 of network 20 is also adjustable by responsive device 121, the output of network 20 corresponds with the station regulation (N'; Equation 4).

The outputs of networks 19, 20 are combined in computer network 117A1 to effect flow through the unit-participation slidewires 21(1A1)—21(3A1) in number corresponding with the units of station A1, of a current whose sense and magnitude corresponds with the algebraic sum of the station requirement and the station regulations [(N'+ΔG); Equation 4]. By manual adjustment of contacts 135 of the unit-participation slidewires, preselected percentages (P'; Equation 4) of this reference signal are allocated to the computer networks 27(1A1)—27(3A1) of the different units.

These computer networks utilize the preselected percentages of the reference signal together with other signals below identified to determine the respective unit requirements and to produce signals for control of their respective generations. The unit requirement network 27(1A1) for unit 1A1 of station A1 is shown in Fig. 2B and now described. Similar networks 27(2A1), 27(3A1), not shown, are used for the other units of station A1.

In adidtion to unit-participation slidewire 21(1A1), the unit requirement network 27(1A1) includes four series-connected networks 137—140 each having its own supply source. The network 137 includes a slidewire 141 whose contact 142 is manually set by the basepoint setter 24(1A1) to the desired basepoint (B'; Equation 4) for the unit 1A1 and a slidewire 143 whose contact 144 is variably positioned by actuator 23(1A1) in accordance with the actual generation of unit 1A1 (G'; Equation 4). The output of component network 137 therefore corresponds with the difference between the actual generation of unit 1A1 and its required generation [(B'−G'); Equation 4].

The component network 139 includes a slidewire 145 whose contact 146 is manually preset to correspond with normal system frequency; a slidewire 147 whose contact 148 is positioned in accordance with actual system frequency, and a slidewire 149 whose contact 150 is manually preset in accordance with the station frequency bias (K; Equation 4). Thus, the output voltage of network 139 as appearing between output contacts 146, 148 corresponds to frequency deviation (ΔF; Equation 4) multiplied by the station bias setting. The slidewire 151 connected across the output terminals 146, 148 of network 139 has a contact 152 manually set to the same percentage (P'; Equation 4) as the unit-participation slidewire 21(1A1). Thus the output of network 26(1A1) as appearing between contact 152 of slidewire 151 and contact 146 of network 139 is the complete percent station frequency-bias factor $$\left[\Delta F\left(\frac{P'}{100}K\right); \text{Equation 4}\right]$$

The component network 140 includes slidewire 153 whose contact 154 is manually preset to correspond with the normal system frequency; a slidewire 155 whose contact 156 is positioned in accordance with actual system frequency; and a slidewire 157 whose contact 158 is manually preset in accordance with the desired frequency bias for unit 1A1 (K'; Equation 4). Thus, the output voltage of network 140 corresponds with the deviation from normal frequency multiplied by the unit frequency bias setting (ΔFK'; Equation 4).

The resultant of the algebraic summation of the output voltage of unit-participation slidewire 21(1A1), and the output voltages of networks 137, 140, 26(1A1) is automatically balanced by responsive device 22(1A1) against the output voltage of rebalancing network 138. The rebalancing network 138 includes fixed resistors and slidewire 159 whose contact 160 is adjustable by responsive device 22(1A1) to rebalance the computer network 27(1A1).

With network 27(1A1) in balance, the positions of contact 160 of exhibiting element 161 movable therewith each corresponds with the generation requirement for unit 1A1 (ΔG'; Equation 4) taking into account the novel unit and percent station frequency-bias factors. The rebalancing adjustment of computer network 27(1A1) is utilized to vary the input to the generating unit 1A1 to return its unit requirement (ΔG') to zero.

Specifically, the rebalancing device 22(1A1) is coupled to contact 163 of slidewire 162 of input network 164 for the controller 28 of governor motor 165. In accordance with the sense of the input to controller 28, which may be of the type discolsed in Davis Patent 2,666,170, the motor 165 operates in one direction or the other to change the setting of speed-governor 178 until the controller is restored to balance by adjustment of rebalancing slidewire 166. The controller 28, as in the aforesaid Davis patent may provide proportional, rate, and reset actions. The change in governor setting effected by controller 28 results in change in setting of valve 167 which controls the supply of motor fluid to the prime mover or turbine 168 of generator 169 of unit 1A1. This action continues until ΔG' is reduced to zero.

The other units of station A1 are similarly controlled. The total generation of the units of station A1 as summated by wattmeter 129A1 is transmitted to the load-dispatcher's office as by a telemetering link including transmitter 170A1 at the station and receiver 78(A1) at the load-dispatcher's office (Fig. 2A) for there positioning the contacts 77 and 93 of the corresponding slidewires 76 and 92 as above-described.

Starting with all unit requirements at zero, then upon occurrence of an area requirement, each of the units of the sustained-response stations A1–A3 will respond to change its generation in sense to correct the deviation from schedule and will continue to change its generation until, but only until, it has assumed its proportionate share of the generation change required of its station.

Normally, the settings of the unit-participation setters for station A1 add to 100% so that the station requirement (ΔG) which is the algebraic summation of the unit requirements, becomes zero when the unit controls have all acted to return their respective unit requirements ΔG' to zero. If the settings of the station-participation setters for the sustained response stations A1–A3 add to 100%, as is normal practice, the area requirement, which is the algebraic summation of the station requirements, becomes zero when all the station requirements become zero. When all unit requirements have been returned to zero, the total generation change of the area is of the correct magnitude so that its effect on tie-line power flow and system frequency, as sensed by the area-requirement computing circuit, has returned the area-requirement to zero.

If area-assist is desired from station A4, the switches 29A, 29B at the load dispatcher's office (Fig. 2A) are closed so that upon occurrence of an area-requirement Raise or Lower pulses are supplied to station A4 (Fig.

2B) from controller 30A (Fig. 2A). In the form schematically shown, the master controller 30A comprises a continuously rotating drum 170 having axially spaced contacts 171, 172 selectively engageable by contact 61 upon displacement thereof from its neutral position by responsive device 38. Preferably, the areas of contacts 171, 172 progressively increase toward opposite ends of drum 170 so that the Raise or Lower pulses produced by the master controller progressively increase in duration for increasing displacement of contact 61 from its neutral position.

The Raise or Lower pulses, as transmitted to station A4 by a telemetering link including transmitter 174 (Fig. 2A) and receiver 175 (Fig. 2B), are respectively utilized periodically to close one or the other of relay switches 176, 177 which control the energization and direction of rotation of governor motor 179. The resulting change in setting of speed-governor 183 results in change of position of valve 180 which controls the supply of motor fluid to prime mover 181 of generator 182 of area-assist unit 1A4.

The other units of area-assist station A4 may be similarly controlled.

Thus, so long as an area requirement exists, the generation of area-assist unit 1A4 is changed in corrective sense within unit-generation limits established by upper and lower limit switches 184, 185 actuated by wattmeter 129(1A4). The total generation of the area-assist station A4 is transmitted to the load-dispatcher's office by means including the station wattmeter 129A4, the telemetering transmitter 170A4 and the receiver 78A4, Fig. 2A. Contact 77 of the corresponding station-generation slidewire of computer network 70A is positioned by the receiver 78A4. The contact 75 of the corresponding station basepoint slidewire 74 of computer network 70A is manually set by the setter 15A4 to a position corresponding with the generation this station is to supply when not providing area-assist action.

Any difference between the positions of these slidewires for station A4 represents the accumulated area-assist action of that station and is introduced as a component of the area-regulation in computer network 65A by its effect on the position of slidewire 67. Thus, any generation changes by the area-assist station A4 above or below the basepoint setting of that station are eventually absorbed by the sustained response units of station A1–A3 as their individual unit requirements are returned to zero by the control action above discussed. During this period and with no concurrent additional load changes in the area, there exists a temporary mismatch between total actual generation and the total required generation of the area. This appears as an area requirement of reverse sense which is effective to return the assist station to its basepoint but has no effect on the control of the sustained-response stations because during this period the reference signal in network 65A remains constant.

The advantages of introducing generation source frequency-bias factors for control of sustained-response stations has been shown in discussion of Figs. 1, 2A, 2B. There will now be discussed the advantages of introducing such frequency-bias factors for control of area-assist sources.

In the area-assist action of Figs. 1, 2A, 2B characterized by continuance of area-assist control action until area requirement is returned to zero, the distribution of the aggregate assist generation is random among the assist sources and the assist generation is not removed from the assisting sources until or unless an area-requirement in the opposite direction occurs or is created.

As will be shown in discussion of Figs. 3, 4A, 4B, 9A the introduction of the source frequency-bias factors in association with individual source controllers having individual output feedback, makes it possible to assign to each of the area-assist generation sources a predetermined relationship between the existing area requirement, frequency, and the generation of that source. That relationship is of such nature that the source is controlled to participate in preset manner in area-assist for local load changes and insures that the individual source controller shall refrain from taking action when there are source-governing responses to remote load changes.

Figure 9A:
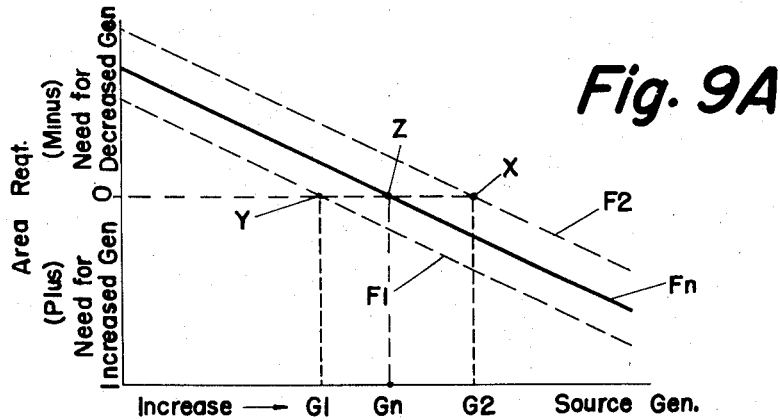

For an understanding of the considerations involved in attaining an area-assist action of such nature, reference is made to the curves of Fig. 9A.

The individual source controllers are to act to produce the source generation defined by these curves for any prevailing value of system frequency and area requirement. The curves F1, Fn, F2 illustrate an assigned predetermined relationship between the generation of an area-assist source, the area requirement and system frequency. When the system frequency is normal, the relationship then maintained between source generation and area requirement is exemplified by curve Fn: for zero area requirement, the source generation is Gn, the preset base-point about which the area-assist action occurs; for a plus or minus area requirement resulting from a local load change, there is a corresponding definite increase or decrease respectively of source generation in amount depending upon the preset slope of curve Fn. Such increase or decrease is the extent of the area-assist action from that source for a local load change having inappreciable effect on frequency. When the system frequency is above or below normal, by an amount ΔF, the relationships to be maintained between source generation and area requirement are respectively exemplified by curves F1 and F2 which are displaced from and parallel to curve Fn in sense corresponding with the direction of the frequency change and in amount corresponding with the setting of the source frequency bias and the magnitude of the frequency change.

The importance of curves F1, F2 and hence of the bias-factors will be demonstrated by describing the control action upon occurrence of a remote load change first without and then with the source bias-factors. Assume that a remote load change causes the frequency-decrease ΔF and that the area-assist source controller operates to maintain characteristic Fn only, i. e., no source bias factors. Since the load change is remote, the area requirement remains on zero. The decreased frequency, however, results in governing action of the source increasing its generation to G2. The generation increment from Gn to G2 divided by the frequency decrement ΔF is the natural governing characteristic of the source. The point X defined by zero area requirement and generation G2 does not fall on curve Fn. Therefore the source controller will decrease the generation of its source undesirably opposing the governing action. Similarly, for a remote load drop, the frequency-increase ΔF results in decreased generation to G1. Point Y does not fall on curve Fn with consequent control action opposing the governing action.

Now for the same remote load changes with accompanying frequency decrease or increase ΔF, it will be assumed that the area-assist controller operates in accordance with the family of curves exemplified by curves F1, Fn, F2, i. e., the source bias factors effective. As before, the source generation increases to G2 or decreases to G1 while area requirement remains on zero. With curves F2 and F1 displaced to pass through points X and Y for the deviation ΔF, i. e., displacements on the generation coordinate equal to G2−Gn and Gn−G1 for the frequency change ΔF, the source controller is inactive and does not oppose the governing action. Such displacement to match the characteristic of the individual controller to the natural governing characteristic of the controlled source is accomplished by setting the source frequency-bias factor to be equal to the natural governing characteristic.

The computation of required area assist generation (ΔGa) for a station based on the relationship shown in Fig. 9A and involving the station frequency-bias factor may be expressed as:

$$(5) \quad \Delta Ga = (B-G) + \frac{Pa}{100}(T) - \Delta F(K)$$

where $Pa$ = station percent participation in area-assist
$B$ = station basepoint ($Gn$ in Fig. 9A)

The magnitude of $Pa$ defines the slope of the curves of Fig. 9A and, as shown in systems later described, can be preset.

It can be shown by numerical examples, as was done for Equations 1 and 2, that the introduction of the station-frequency bias factor, wth its setting K equal to the natural governing characteristic of the station, maintains the station area-assist requirement on zero upon occurrence of remote load changes. As pointed out in discussion of sustained-response, the inherent governing characteristic of a station may be variable and hence cannot be matched throughout the generation range by a preset frequency-bias. The same is true for an area-assist station. This, however, creates no operating difficulty or limitation because then the control action based on Equation 5 to reduce $\Delta Ga$ to zero corrects any mismatch, imposing upon the area-assist station a desired frequency-responsive characteristic which is defined by its preset frequency-bias while at the same time determining the extent of its participation in the area-assist action of the area. In fact, the unit speed-governors of an area-assist station may be set with a steep droop, or otherwise set to be unresponsive to normal frequency changes, and retained only for emergency overspeed protection. In such case, a control based on Equation 5 and with generation adjusted until $\Delta Ga$ is zero, effectively assigns to the area-assist station a preselected frequency-governing characteristic effective over the full operating range and free of the aforesaid usual disadvantages and vagaries of speed governors.

In Fig. 3, the area requirement block 10B and that portion of the system to the right of line D—D provide an area-assist control having the assigned area-assist relationships shown in Fig. 9A and whose individual unit controllers are of mandatory type to reduce the area-assist unit requirement to zero. The area-assist control of Fig. 3, unlike that of the right-hand portion of Fig. 1, involves division of the area-requirement signal into fractional signals in accordance with the percent participation desired of each of the area-assist stations. It is, however, like that of the left-hand portion of Fig. 1 resulting when the area and station regulation factors and the percent area frequency bias and percent station frequency bias factors are omitted. This is evident from the equivalence of Equations 3 and 5. Each of these fractional signals is compared with the difference between the basepoint and actual generation of the corresponding area-assist station is modified by the station-frequency bias for computation of the station requirement. The station-requirement signal, as reproduced at the area-assist station, is subdivided in accordance with the desired percent participation of the respective generating units of that station in the area-assist generation assigned to the station. For computation of a unit requirement, the corresponding fraction of the station-requirement signal is compared with the algebraic sum of the basepoint, the actual unit generation and the unit frequency-bias. The resulting unit requirement signal $\Delta G'a$ may be expressed as:

$$(6) \quad \Delta G'a = (B'-G') + \frac{P'a}{100}(\Delta Ga) - \Delta F(K')$$

where $P'a$ = unit percent participation in area assist

The unit-requirement signal is applied to effect a mandatory change in the governor setting of the unit as in the system of Figs. 1, 2A and 2B until $\Delta G'a$ becomes zero.

More particularly, selected percentages of the area-requirement signal are allocated by the participation setters 12B4—12B6 for control of area-assist stations B4—B6. For control of station B4, for example, the output of participation setter 12B4 is compared by a network or device 13B4 with the resultant of signals respectively corresponding with the actual generation of station B4 as reproduced by device 14B4; the basepoint generation of station B4 as reproduced by device 15B4 and the preset frequency-bias factor for station B4 as produced by device 16B4.

The output signal of comparator 13B4 is representative of the station requirement for station B4 ($\Delta Ga$: Equation 5), the change in generation required of station B4 to meet its proportionate share of the area-assist action. Signals respectively representative of the station requirements of the other stations B5, B6 are similarly derived from the participation setters 12B5, 12B6 and comparators 13Z5, 13B6. The station-requirement signals are transmitted from the load dispatcher's office to the area-assist stations B4—B6 for control of the units of these stations.

At station B4, for example, its requirement signal is reproduced as the output signal of device 19B4; by the participation setters 21(1B4)—21(3B4), selected fractions of this signal are derived for control of the corresponding units 1B4—3B4 of station B4. The output of participation setter 21(1B4) is compared by a network or device 22(1B4) with the resultant of signals respectively corresponding with the actual generation of unit 1B4 as produced by device 23(1B4), the basepoint setting of 1B4 as reproduced by device 24(1B4), and the preset frequency-bias for unit 1B4 as produced by device 25(1B4). The output signal of comparator device 22(1B4) therefore is representative of unit requirement of unit 1B4 ($\Delta G'a$; Equation 6), the change in generation required of unit 1B4 to meet its proportionate share of the area-assist action.

Signals respectively representative of the unit requirements for each of the other units (2B4), (3B4) of station B4 are similarly derived from networks respectively including the participation setters 21(2B4), 21(3B4) and comparators 22(2B4), 22(3B4).

The respective requirement signals for units 1B4—3B4 of area-assist station B4 may be reproduced for automatic control of the governor-adjusting motors of the corresponding units. As schematically illustrated in Fig. 3, the governor-motor controller 28(1B4) for unit 1B4 varies the governor setting to reduce the computed generation requirement of unit 1B4 to zero.

The area-assist generation of stations B4—B6, no matter how large the selected area-assist participation may be, does not return the area-requirement to zero. When the area includes sustained-response stations, they reduce the area-requirement to zero as will now be described in discussion of that portion of Fig. 3 to the left of line D—D with switch 186 closed and switch 187 open.

The control of the units of the sustained-response stations of Fig. 3 is a permissive type of control, i. e., control on a unit occurs only when its requirement and the requirement of its station are of the same sense as the prevailing area requirement. The sustained-response control of Fig. 3, like that of my aforesaid application Serial No. 344,838 and unlike that of Figs. 1, 2A, 2B hereof, does not involve inclusion of frequency-bias factors in the computation of station and unit requirements.

The blocks 10B and 11B of Fig. 3 are generically illustrative of networks or devices for respectively producing "area-requirement" and "area-regulation" signals which are combined to provide a reference continuously corresponding in sense and magnitude with the change in generation required of area B to bring it back on schedule. Selected percentages of this reference signal are allocated by the participation setters 12B1—12B3 for control of the individual sustained-response stations of the area. For control of station B1, for example, the output of participation setter 12B1 is compared by a device or network 13B1 with the resultant of signals respectively corresponding with the actual generation of station B1 as reproduced by device 14B1 and the basepoint generation of station B1 as reproduced by network or device 15B1. It will therefore be understood that the output signal of comparator 13B1 of Fig. 3 is representative of the station requirement of sustained-response station B1.

Signals respectively representative of the station requirements for other sustained-response stations B2, B3 of area B are similarly derived from the participation setters 12B2, 12B3, comparators 13B2, 13B3 and associated devices or networks. The station-requirement signals are transmitted from the load-dispatcher's office to the corresponding sustained-response stations of area B and are there utilized, as more specifically described, to effect a permissive control of the generating units of these stations.

Specifically and as schematically illustrated in Fig. 3, the requirement signal for station B1 is reproduced at the load dispatcher's office by device 219B1 and is telemetrically reproduced at station B1 as the output signal of a suitable network or device 19B1 where it is combined with the station-regulation signal produced by network or device 20B1. The combination of these two signals provides a reference signal, in sense and magnitude corresponding with the change in generation from its basepoint required of station B1 so that its total generation will be equal to its programed share of total generation required of the area to meet area schedule.

Selected percentages of this station reference signal are allocated by the participation setters 21(1B1)—21(3B1) for computation of the individual unit requirement. The output signal of participation setter 21(1B1) is compared by network or device 22(1B1) with the resultant of signals respectively corresponding with the actual generation of unit 1B1 as produced by network or device 23(1B1) and the preset basepoint generation of unit 1B1 as produced by network or device 24(1B1). The output signal of comparator 22(1B1) is representative of the unit requirement of generating unit 1B1, i. e., the change in generation from its basepoint required of unit 1B1 so that its generation will be equal to its programed share of the total generation required of the station.

Signals respectively representative of the unit requirements of each of the other units 2B1, 3B1 of station B1 are similarly derived from the participation setters 21(2B1), 21(3B1) and associated devices including the comparators 22(2B1), 22(3B1).

So long as the area requirement of area B is not zero, raise or lower pulses are produced by master controller 30B and are transmitted permissively to the several sustained-response stations B1—B3 for transmission permissively there to the governor controls of the individual units of the station. So long as the station requirement of station B1, for example, is unsatisfied, the corresponding station-requirement controller switch 190(B1) of device 219B1 remains closed for transmission of raise or lower pulses to station B1 and there to the individual units of station B1 provided their respective unit controller switches are closed.

Thus so long as the requirement for an individual unit, for example unit 1B1, remains unsatisfied, the corresponding unit controller switch 191(1B1) remains closed to provide a transmission path for the raise or lower pulses to the governor control of that particular generating unit.

The control of the units of the station is therefore permissive in that the area-requirement control pulses are sent to the station from the load dispatcher's office only if its station requirement is unsatisfied and of the same sense as the area requirement and are permitted to act upon an individual unit of that station only if that unit's requirement is unsatisfied and of the same sense as the area requirement.

In the permissive sustained-response control system of Fig. 3, the computations of station and unit requirements may additionally include the frequency-bias factors shown for the mandatory sustained-response stations of Fig. 1. As in Fig. 1, this would increase accuracy of these computations but would have relatively little effect on the sustained control action of Fig. 3 because of its permissive nature.

Since with the sustained-response computation arrangements shown in Fig. 3, the algebraic sum of computed station requirements is equal to prevailing area requirement, there will always be one station having a requirement of the same sense as the area requirement. Also since the algebraic sum of computed unit requirements in each sustained-response station is equal to the prevailing station requirement, there will always be at least one unit among the sustained-response stations having a unit requirement of the same sense as the area requirement and the requirement of its station. Thus, there will always be at least one generator responding to raise or lower control pulses from the master control, insuring that area requirement shall be returned to zero by the sustained-response action. While area-requirement is thus being returned to zero, the mandatory control action of the area-assist units of Fig. 3 will progressively reduce their area-assist contribution reaching zero when the area-requirement reaches zero. In this process, area-assist generation initially provided by the area-assist units is smoothly transferred to the sustained generation source which is to retain it without in the meantime reversing the sense of area requirement.

Further improvement in the computation of station and unit requirements of the sustained-response sources of Fig. 3 may be achieved by introduction into area regulation of the area-assist generation (difference between basepoint and generation) of one or more of the area-assist stations as by closure of one or more of the corresponding switches 187. With all switches 187 closed, each station and unit requirement of the sustained-response sources is based not only on the prevailing generation of the sustained-response stations and the prevailing area requirement but also upon that portion of area-requirement already absorbed by the area-assist sources but which is to be ultimately transferred to the sustained-response sources.

Figs. 4A, 4B illustrate a particular example of the computer-control system of Fig. 3 as utilized for automatic control of stations and units of generating area B. Fig. 4A illustrates the networks and devices which are disposed at the load dispatcher's office of area B for determining the requirements of the various sustained-response stations and of the various area-assist stations. Fig. 4B illustrates the networks and devices for controlling units of a sustained-response station B1 and for controlling units of an area-assist station B4.

The requirement of area B as computed by network 39B (Fig. 4A) is reproduced as a setting of slidewire 35 in the computer network 65BS for the sustained-response stations B1—B3, and as a setting of similar slidewire 35 in computer network 65BA of the area-assist stations B4—B6.

Into network 65BS is also reproduced, as a setting of slidewire 67, the area-regulation (with switches 187 open) of the sustained-response stations B1—B3. This area-regulation is computed by network 70B. Since no area-regulation factor is introduced into network 65BA for the area-assist stations, the corresponding area-regulation slidewire is omitted; or deenergized if physically included.

The network 85B1 for computing the station requirement of sustained-response station B1 includes: the participation setter 12B1 whose output is a preselected percentage of the summation of area requirement and sustained area regulation; the network 86 whose output is representative of the difference between the basepoint setting and the generation of station B1; and the rebalancing network 87 whose slidewire 109 is adjusted by responsive device 13B1. The station requirement so computed is transmitted to station B1 as over a telemetering link including transmitter 112B1. Similar networks are provided for computing the station requirements of other sustained-response stations of area B.

So long as the station requirement for station B1 is not zero, one or the other of switches 195, 196 is controlled by cam 197 of responsive device 13B1 to provide a path to station B1 for transmission of Raise or Lower pulses produced from the master controller 30B when switch 186 is closed. Such path is broken when the station requirement has been returned to zero, notwithstanding that Raise or Lower pulses may still be transmitted to other sustained-response stations. Paths for transmission of Raise and Lower pulses from controller 30B to the other sustained-response stations are similarly controlled.

The network 85B4 for computing the station requirement ($\Delta Ga$; Equation 5) for area-assist station B4 includes: the participation setter 12B4 whose output is a preselected percentage (Pa: Equation 5) of the area requirement (T; Equation 5); the network 86 whose output is representative of the difference $[(B-G)$; Equation 5] between the basepoint setting (B; Equation 5) and the generation of station B4 (G; Equation 5); the network 89 whose output corresponds with the station bias factor $[\Delta F(K)$; Equation 5], equal to the deviation from normal system frequency ($\Delta F$; Equation 5) multiplied by the station-bias setting (K; Equation 5); and the network 87 for rebalancing the computing network 85B4 under control of responsive device 13B4. The area-assist station requirement so computed is transmitted to area-assist station B4 over a telemetering link including transmitter 112B4 for use in mandatory control of the generating units of that station.

Similar networks are provided for computing the area-assist station requirements of the other area-assist stations B5, B6 of area B.

If the area-assist generation of area-assist station B4 is to be included in the computation of station requirement of the sustained-response stations, as above discussed in connection with Fig. 3, the switches 187 of network 70B are closed to include in that network the difference in outputs of its basepoint slidewire 71 and its station-generation slidewire 72. The area-assist generation signals of stations B5, B6 may be similarly introduced into computer network 70B.

At sustained-response station B1 (Fig. 4B), the telemetric receiver 113B1 adjusts slidewire 114 so that the output of network 19 of computer network 117B1 corresponds with the computed station requirement for station B1. In network 117B1 is also reproduced, as a setting of slidewire 119 of network 20, the station regulation of station B1. This term is computed by network 122B1.

Preselected percentages of the reference signal provided by combining the outputs of network 19, 20 of computer network 117B1 are allocated by the unit participation setters 21(1B1)—21(3B1) to the different units of station B1 for sustained-response control of their generation.

The computer network 27(1B1) for determining the requirement for unit 1B1 includes: the unit participation slidewire 21(1B1); the network 137 whose output corresponds with the difference between the basepoint and the generation of unit 1B1; and the rebalancing network 138.

So long as the unit requirement for unit 1B1 is not zero, the control cam 200 of responsive device 22(1B1) is displaced from its neutral position to close one or the other of switches 201, 202 for transmission to the governor motor 165 for unit 1B1 of Raise or Lower pulses produced by closure of relay contacts 176, 177 selectively operated effectively to repeat Raise or Lower control pulses received from the load dispatcher's office by receiver 175B1. Thus until the unit requirement is returned to zero, at which time cam 200 is again in neutral position, the governor setting is increased or decreased by incoming Raise or Lower pulses. The units 2B1, 3B1 of sustained-response station B1 are similarly controlled.

The total generation of the units of station B1 as summated by wattmeter 129(B1) is transmitted to the load dispatcher's office as by the telemetering link including transmitter 170(B1).

As above pointed out in discussion of Fig. 4A, the requirements of the area-assist stations B4—B6 as computed at the load dispatcher's office by networks 85B4—85B6 are transmitted to the corresponding area-assist stations.

At area-assist station B4 (Fig. 4B), the telemetric receiver 113B4 adjusts slidewire 114 of network 19 to reproduce the station-requirement signal ($\Delta Ga$; Equation 6) in the computer network 117B4. The computer network 117B4 includes the participation slidewires 21(1B4)—21(3B4) in number corresponding with the generating units of area-assist station B4. For each of the units, the setting of participation slidewire contact 135 (P'a; Equation 6) determines the extent of that unit's participation in the area-assist action of the station. More particularly, each unit will take that share of the station area-assist generation which is defined by the ratio of the participation setting of the unit to the sum of the participation settings of the three area-assist units in the station.

The network 27(1B4) for computing the individual area-assist requirement ($\Delta G'a$; Equation 6), of unit 1B4 comprises: the selected portion of corresponding participation slidewire 21(1B4) of network 117B4; the network 137 whose output corresponds with the difference between the basepoint setting (B'; Equation 6) and the generation (G'; Equation 6) of unit 1B4; the network 139 whose output $[\Delta F(K')$; Equation 6] corresponds with the difference ($\Delta F$; Equation 6) between the preselected normal frequency and the actual frequency, as multiplied by the frequency-bias setting (K'; Equation 6) for unit 1B4; and the rebalancing network 138 whose slidewire 159 is adjusted by responsive device 22(1B4) concurrently with its adjustment of input slidewire 162 of unit governor controller 28.

The setting of governor 179 for the area-assist unit 1B4 is continuously adjusted until unit area-assist requirement ($\Delta G'a$; Equation 6) is returned to zero. Unit 1B4 will then have taken its allocated share of area-assist generation. By combining Equations 5 and 6, it can be shown that after the unit area-assist requirement ($\Delta G'a$; Equation 6) has been reduced to zero by control of the setting of governor 179 for unit 1B4, the relationship between the area-assist generation of the unit and a prevailing area requirement will depend on the area-assist participation setting for station B4 at the load dispatcher's office, the unit area-assist participation setting at the station, and the ratio of this unit area-assist participation setting to the total of such settings at the station for units 1B4—3B4.

An alternative embodiment of area-assist control action is to substitute at transmitter 112(B4) Fig. 4A, an area-requirement signal from comparator 38 (Fig. 4A) for the station-requirement signal from comparator 13B4. Receiver 113(B4) Fig. 4B will then receive the area requirement instead of the station-requirement signal, and contact 115 on slidewire 114 of network 117B4 will then be actuated by area requirement instead of station requirement. Area-assist action for station B4 would then be set at the station only and, more specifically, the relationship between area-assist generation of unit 1B4 to a prevailing area requirement when control has acted to reduce ΔG'a for unit 1B4 to zero can then be set directly on slidewire 21(1B4) of network 117(1B4). Similar direct settings may be made for units 2B4 and 3B4 on their respective slidewires 21(2B4) and 21(3B4).

Another alternative embodiment of area-assist action is to retain at the load dispatcher's office the station area-assist computing networks shown in Fig. 4A, but to expand the unit-requirement computing networks at one or more of the area-assist stations so that they become the equivalent to the network shown for unit 1A1 in Fig. 2B. Specifically, this means in Fig. 4B that network 117B4 would be expanded to include the station-regulation signal, while network 27(1B4) would be expanded to include a signal from percent station bias factor. With these additions to its computing network, area-assist unit 1B4 of Fig. 4B would have a computing and control network similar to sustained-response unit 1A1 of Fig. 2B. In network 117B4, the sum of the participation setters 135 would usually be equal to 100 percent. The area-assist action for station B4 would then be assigned at the load dispatcher's office only. The settings of participation setters 135 of network 117B4 at the station, if equal to 100 percent, would not affect the aggregate area-assist action for station B4 as assigned by the load dispatcher, and units 1B4—3B4 would each participate in the assigned station area-assist action in proportion to the setting of its contact 135. When unit-requirement of unit 1B4 has been returned to zero by control action on the setting of governor 179 for unit 1B4, the relationship of its area-assist generation to a prevailing area-requirement will be determined by the product of the setting of its contact 135 and the setting of the station area-assist participation setter 12B4 (Fig. 4A).

In the computing and control arrangements described in connection with Figs. 1, 2A, 2B, 3, 4A, 4B, area-assist action is assigned to one group of sources while sustained-response action is assigned to a different group of sources within the area. Frequently, in the practical operation of an area, it will be desired to assign both area-assist and sustained-response to a generating source. This may be done by assigning assist-action to a station and having its units participate in such station-assist on a basis of the same programed participation that applies to station sustained-response; or the units may be assigned a different program for participation in the assist-action than applies to their participation in the sustained-response; or the assist-action may be assigned to stations and individual units directly at the stations without an assignment of assist-action at the dispatcher's office. Embodiments of my invention wherein both assist-action and sustained-response are assigned to individual stations and units are shown in Figs. 5, 6A, 6B, 7, 8A, 8B and will now be described.

The computer control system shown in Fig. 5 is similar to that of previous figures in that there is a predetermined programed participation by the stations and units of an area in the sustained-response of the area supplemented by an area-assist action. In Fig. 5, all control is of the mandatory type, and hence frequency-bias factors as already described are included in the computation of station and/or unit requirements. The system of Fig. 5 differs from the systems of preceding figures in that the sustained-response and area-assist actions may be by the same generating source or sources with any preselected programing of the sustained-response and with preset participation for each such source in area-assist action.

With switches 205(C1)—205(C3) and 206(C1)—206(C3) in their open positions O, and with switch 188 in its full-line closed position, the system of Fig. 5 has no area-assist action and its sustained-response control is identical with that of Fig. 1. Since here, as in other figures, corresponding elements are identified by similar reference numbers, with addition of letter-suffixes to distinguish between different stations and units, the corresponding portion of the description of Fig. 1 is applicable here and is not repeated in detail. At the load dispatcher's office, a pre-selected percentage of the combined area-requirement and area-regulation reference signal is assigned by each of the participation setters 12C1—12C3 for introduction into the respective networks which compute the various station requirements. This is for the sustained-response of stations C1—C3, Fig. 5. The sum of the participation setters 12C1—12C3 would usually be 100 percent. The station requirement computation for this sustained-response is as expressed by Equation 2.

With the switches 205(C1)—205(C3) in the closed position S, and with switch 188 in full-line closed position, an additional signal corresponding to a pre-selected percentage of area requirement is assigned by each of the participation setters 212C1—212C3 for introduction into the respective networks which compute the various station requirements. This additional signal is for area-assist action of stations C1—C3. The sum of the area-requirement participation setters 212C1—212C3 need not be equal to 100 percent. The sum of the settings determines the extent of the area-assist action, which stations C1—C3 will take in addition to their sustained-response assignments. The total computed requirement of a station for such combined sustained-response and area-assist action (ΔG) may be expressed as:

(7)
$$\Delta G = (B-G) + \frac{Ps}{100}(N+T) + \frac{Pa}{100}(T) - \Delta F\left(K - \frac{PsL}{100}\right)$$

where $Ps$ = station percent participation in sustained-response of the area $Pa$ = station percent participation for area-assist action Combining the T terms, this equation may be rewritten:

(8)
$$\Delta G = (B-G) + \frac{Ps}{100}(N) + \left(\frac{Ps+Pa}{100}\right)T - \Delta F\left(K - \frac{PsL}{100}\right)$$

A station requirement computing circuit based on Equation 8 would involve a separate setter for participation in the area-regulation signal (such a setter would correspond to $Ps$ in Equation 8) and a separate setter for participation in the area-requirement signal (such a setter would correspond to $Ps+Pa$ in Equation 8). The setting for participation in the area-requirement signal should preferably be at least equal to, or greater than, the setting for participation in the area-regulation signal, in which case any difference between them represents the area-assist action assigned to the corresponding station.

A system including such individual area-regulation and area-requirement participation settings is obtainable at the load dispatcher's office in Fig. 5 with switch 188 in its dotted-line open position, and switches 205(C1)—205(C3) in their closed positions S. Percent participation ($Ps$: Equation 8) in area regulaion (N) is set with setters 12C1—12C2 and percent participation [($Ps+Pa$): Equation 8] in area requirement (T) is set with setters 212C1—212C3. The signal derived from comparator 13C1 and transmitted to station C1 is a measure of the total of the sustained-response and area-assist action required of that station.

At station C1, when switch 206C1 is in the open position O, the computing and control system is identical to that shown for station A1 in Fig. 1. As in Fig. 1, a pre-selected percentage of the combined station-requirement and station-regulation reference signal is assigned by each of the participation setters 21(1C1)—21(3C1) for introduction into the respective networks which compute the various unit requirements for units 1C1—3C1.

The sum of the participation setters 21(1C1)—21(3C1) would usually be 100 percent. In Fig. 5, the station requirement which feeds the unit computing and control system may contain only a sustained regulation requirement (ΔG: Equation 2), or may contain both sustained-response and area-assist requirements (ΔG: Equation 7 or 8), depending on the respective settings at the load dispatcher's office, as already discussed, of switches 205(C1)—205(C3) and 188 and of participation setters 12C1—12C3 and 212C1—212C3.

In either case, the computed requirement of the unit (ΔG') may be expressed as:

$$(9) \quad \Delta G' = (B' - G') + \frac{P's}{100}(N' + \Delta G) - \Delta F\left(K' - \frac{P'sK}{100}\right)$$

where $P's$ = unit percent participation in the total of sustained-response and any area-assist action preset for the station at the load dispatcher's office.

When, at the load dispatcher's office, the switch 188 is in full-line closed position and switch 205C1 is in open position O, area-assist action may be assigned to units 1C1—3C1 directly at the station instead of being preset for the station at the load dispatcher's office by closing switch 206C1 in position U. The station-requirement signal derived from comparator 13C1 at the load dispatcher's office and transmitted to the station for introduction into the unit-requirement computer networks corresponds with ΔG of Equation 2 and so includes sustained-response only. An additional signal corresponding to a pre-selected percentage of area requirement is assigned by each of the participation setters 221(1C1)—221(3C1) for introduction into the respective networks which compute the various unit requirements. This additional signal is for area-assist action of units 1C1—1C3. The sum of the participation setters 221(1C1)—221(3C1) need not be equal to 100 percent. The sum of these settings determines the extent of the area-assist action which units 1C1—3C1 of station C1 will take in addition to their sustained-response assignment. With this arrangement, the total computed requirement of each individual unit, i. e., the combination (ΔG') of the sustained-response and the directly assigned area-assist action may be expressed as:

$$(10) \quad \Delta G' = (B' - G') + \frac{P's}{100}(N' + \Delta G) - \Delta F\left(K' - \frac{P'sK}{100}\right) + \frac{P'a}{100}(T)$$

where $P'a$ = unit percent participation for area-assist action.

It will be seen from Equation 10 that the area-assist action of the unit is related to a prevailing area requirement T by the area-assist participation setting $P'a$. If all of the area-assist action in the area is directly assigned to generating sources in the manner just described, and assuming that area requirement and all unit requirements of area-assist sources are initially zero, and that a local load is initially completely satisfied by a power interchange over the tie-lines, the percent reduction in the initial area requirement effected by area-assist action may be expressed as:

$$(11) \quad \text{Percent reduction} = \left(\frac{\Sigma P'a}{\Sigma P'a + 100}\right)100$$

where $\Sigma P'a$ is the summation of the participation settings for all of the generating sources having direct assignment in the area-assist action.

More specifically, if station C1 is the only one participating in area-assist action, and if the sum of the setters 221(1C1)—221(3C1) is 100 percent, the percent reduction of initial area requirement is given by:

$$(11A) \quad \left(\frac{200}{100+100}\right)100 = 50\% \text{ reduction}$$

Similarly, for total area-assist participation settings of 200 percent, the reduction is:

$$(11B) \quad \left(\frac{200}{200+100}\right)100 = 66\tfrac{2}{3}\% \text{ reduction}$$

Still another control execution may be obtained (Fig. 5) on the units of station C1 by closing switch 206C1 in position R. Now there is added, to the percent participation in station-requirement and station-regulation determined by the settings of participation setters 21(1C1)—21(3C1), an additional station-requirement signal derived from participation setters 221(1C1)—221(3C1). In this arrangement, the station-requirement signal sent to the station from the load dispatcher's office may, as above described, include sustained-response only, or may additionally include area-assist action. Within the station, generation assistance in fulfilling this station-requirement may be obtained from an individual unit in addition to its own sustained participation in the total generation allocated to that station.

For this arrangement, computed requirement of a unit may be expressed as:

$$(12) \quad \Delta G' = (B' - G') + \frac{P's}{100}(N' + \Delta G) - \Delta F\left(K' - \frac{P's}{100}K\right) + \frac{P'a}{100}(\Delta G)$$

By combining terms, Equation 12 may be rewritten as:

$$(13) \quad \Delta G' = (B' - G') + \frac{P's}{100}(N') + \frac{P's + P'a}{100}(\Delta G) - \Delta F\left(K' - \frac{P's}{100}K\right)$$

A control in accordance with Equation 13 may be obtained by closing switch 206(C1) in the R position and opening switch 192(C1) in the signal channel from station-requirement meter 19C1 to the participation setters 21(1C1)—21(3C1).

These participation settings now correspond to $P's$ in the station-regulation (N') term of Equation 13, and their sum will usually total 100%. Participation setters 221(1C1)—221(3C1) are used to derive a signal from station-requirement. Their settings correspond with $P's$ plus $P'a$ in the station-requirement (ΔG) term of Equation 13 and respectively will usually be at least equal to the corresponding settings of participation setters 21(1C1)—21(3C1) and each respectively greater thereto by the generation assist desired of a given unit in a station.

Figs. 6A and 6B illustrate a particular example of the computer control system of Fig. 5 as utilized for automatic control of stations and units of generating area C. Fig. 6A illustrates the networks and devices at the load dispatcher's office of area C, and Fig. 6B illustrates the networks and devices at one of the stations (station C1) of area C.

In network 65CS is reproduced, as a setting of slidewire 67, the area-regulation N (Equations 7 and 8) as computed by network 70C. With switch 188 in full-line position (Fig. 6A), the area-requirement (T: Equations 7 and 8) of area C, as computed by network 39C, is reproduced, as a setting of slidewire 35, in network 65CS for computation of the sustained-response of stations C1—C3. The requirement of area C is also reproduced, as a setting of similar slidewire 35 in network 65CA, for computation by that network of the area-assist response of the same stations.

With switch 205(C1) in the S position (Fig. 6A), the network 85C1 for computing the station-requirement (ΔG: Equation 7) of station C1 includes: the sustained-response participation slidewire 12C1 whose output $$\left[\frac{Ps}{100}(N+T)\right] \quad \text{Equation 7}$$

is a preselected percentage (Ps) of the summation of the area-requirement and area-regulation signals [N+T]: the area-assist participation slidewire 212(C1) whose output $$\left[\frac{Pa}{100}\cdot T\right]$$

is a preselected percentage (Pa: Equation 7) of area-requirement (T: Equation 7); the network 86 whose output [(B−G): Eq. 7] corresponds with the difference between the basepoint setting (B) and the generation (G) of station C1; the network 17C1 whose output $$\left[\Delta F\left(-\frac{PsL}{100}\right)\right] \quad \text{Equation 7}$$

corresponds with the difference between normal and actual system frequency (ΔF) multiplied by a percentage (Ps) of the area frequency-bias setting (L); the network 89 whose output (ΔFK: Equation 7) corresponds with the difference between normal and actual frequency (ΔF) as multiplied by the station frequency-bias setting (K); and the rebalancing network 87.

The station-requirement so computed comprises the sustained-response and any preset area-assist.

With switch 188 in dotted-line position (Fig. 6A) to exclude the area-requirement signal from computer network 65CS, the output of the participation slidewire 12C1 includes only the area-regulation reference and becomes $$\left(\frac{Ps}{100}N\right) \quad \text{Equation 8}$$

With switch 205C1 still in full-line position (Fig. 6A), the output of the participation slidewires 212(C1) is, as before, related to area-requirement. With the setting of the latter slidewire equal to the sum of the sustained-response assignment (Ps) and the assigned area-assist action (Pa), its output then becomes $$\left[\frac{(Ps+Pa)}{100}T\right]$$

The station-requirement of station C1, as computed by network 85C1, may now be expressed by Equation 8 above. When the setting of 212C1 is greater than that of 12C1, there is an area-assist action by station C1 of magnitude related to the difference between the settings. For equal settings of 212C1 and 12C1 (i. e., Pa=0), there is no area-assist action by station C1 and its requirement computation is equivalent to that defined by Equation 2. With 12C1 set to zero (i. e., Ps=0), there is no sustained response by station C1 and its requirement computation is that defined by Equations 3 and 5.

Thus by selection of switch positions and participation settings, the load dispatcher may assign to any one or more stations of the area, a certain sustained-response action without area-assist, a certain area-assist action without sustained-response, or a certain combination of sustained-response and area-assist.

The station-requirement for station C1 as computed by network 85C1 is transmitted to station C1 (Fig. 6B) by a telemetering link including transmitter 112(C1) and receiver 113(C1) for use there in either or both of the networks 117(C1S), 117(C1A), depending upon the selected positions of switches 192(C1) and 206(C1) for computation of unit-requirements. The requirements for the stations C2, C3 of area C are similarly computed, transmitted to them and there utilized.

With switch 192(C1) in the full-line position, the station-requirement signal, as reproduced by the setting of slidewire 114, is introduced into network 117(C1S) and there combined with the station-regulation signal, as reproduced by the setting of slidewire 119. With switch 206(C1) in the off-position O, the computer network 117(C1A) is effectively disabled and does not affect the computation of unit-requirement. With the switches in these positions, the unit-requirement (ΔG′) of unit 1C1 as computed by network 27(1C1) is that expressed by Equation 9 in which the ΔG is that of Equations 2, 3, 5, 7 or 8 depending upon the selection, at the load dispatcher's office (Fig. 6A), of the positions of switches 188, 205(C1) and of the settings of participation slidewires 12(C1) and 212(C1).

The network 27(1C1), Fig. 6B, computing the unit-requirement (ΔG′: Equation 9) of unit 1C1 includes: the participation slidewire 21(1C1) whose output $$\left[\frac{P'_s}{100}(N'+\Delta G)\right] \quad \text{Equation 9}$$

is a preselected percentage (P′s) of the summation (N′+ΔG) of the station-regulation signal (N′) and station-requirement signal (ΔG); the network 137 whose output [(B′−G′): Eq. 9] corresponds with the difference between the basepoint setting (B′) and the generation (G′) of unit 1C1; the network 26(1C1) whose output $$\left[\Delta F\left(\frac{P'sK}{100}\right)\right] \quad \text{Equation 9}$$

corresponds with the difference (ΔF) between normal and actual system frequency as multiplied by the percentage (P′s) of the station-frequency bias setting (K); the network 140 whose output [ΔFK′]: Eq. 9] corresponds with the frequency deviation ΔF from normal frequency as multiplied by the unit-frequency bias setting (K′); and the rebalancing network 138.

The responsive device 22(1C1) which adjusts network 138 to rebalance computer network 27(1C1) concurrently unbalances the input circuit 164 of unit controller 28. The motor 165 thereupon operates to change the input to generator 169 of unit 1C1 and to balance the controller input circuit. Such control action persists until ΔG′ of Equation 9 is returned to zero.

The inputs to the units 2C1, 3C1 of station C1 may be similarly controlled. The generations of units 1C1—3C1 are introduced as by wattmeters 129(1C1)—129(3C1) into the station-regulation computer network 122C1 at station C1 and the total generation of these units is introduced, as by wattmeter 129C1, transmitter 170C1 and receiver 78C1, into the area-regulation computer network 70C (Fig. 6A) at the load dispatcher's office.

With switch 206(C1) in dotted-line position U, (Fig. 6B), the area-requirement signal, as received by receiver 208(C1) of station C1, is thus reproduced as the output of network 10C1 of computer network 117(C1A) whose participation slidewires 221(1C1)—221(3C1) are then preset for participation of units 1C1—3C1 in area-assist action. With switch 206(C1) in this position, the output $$\left(\frac{P'a}{100}T\right)$$

of slidewire 221(1C1) of network 117(C1A), as determined by the setting P′a of that slidewire and the prevailing area-requirement T, is introduced as an additional factor in the network 27(1C1) for computing unit-requirement (ΔG′). With switch 192(C1) concurrently in full-line position, the unit-requirement (ΔG′) as computed by network 27(1C1) may now be expressed by Equation 10.

Usually when the unit-requirement is so computed and control of motor 165 of unit 1C1 persists to return the unit-requirement (ΔG′) to zero, the station-requirement (ΔG) for station C1 is computed at the load dispatcher's office in accordance with Equation 2 as above discussed (Figs. 5 and 6A). When this is done, sustained-response for station C1 is assigned at the load dispatcher's office and any desired area-assist action for one or more units 1C1—3C1 of that station is assigned at station C1.

With switch 206(C1) in full-line position R (Fig. 6B), the station-requirement signal, as received by receiver 113C1 of station C1, is there reproduced as the output of network 19 of computer network 117(C1A). The output of each of participation slidewires 221(1C1)—221(3C1) is now $$\left(\frac{P'a}{100}\Delta G\right)$$

With switch 192(C1) concurrently in full-line position, the unit-requirement ($\Delta G'$) of unit 1C1 as computed by network 27(1C1) may now be expressed as Equation 12.

When control of motor 165 of unit 1C1 persists to return the unit-requirement to zero, setting of its participation slidewire 212(1C1) to value greater than zero will provide generation assistance from unit 1C1 in addition to its sustained-response assignment as set by its participation slidewire 21(1C1) to help the station C1 meet its requirement until the other unit or units have completed their sustained-response. The station requirement $\Delta G$ for which this generation-assistance is provided within the station may be station sustained-response only, station area-assist only, or a combination of them as computed at the load dispatcher's office in accordance with Equations 2, 3, 5, 7 or 8.

With switch 206(C1) in full-line position R (Fig. 6B) and with switch 192(C1) in dotted-line position to bypass or effectively omit network 19 of computer network 117(C1S) so that it is now fed only from station-regulation network 20, the station-requirement signal is introduced into unit-requirement computer network 27(1C1) only through network 117(C1A) and unit-participation slidewire 212(1C1) of that network. The output of participation slidewire 21(1C1) of unit 1C1 is now $$\left(\frac{P's}{100}N'\right)$$

where $P's$ is the setting of slidewire 21(1C1) and represents the sustained-response assignment of unit 1C1. Setting $P'a$ represents the generation-assistance desired of the unit over and above its sustained-response and when the setting of slidewire 212(1C1) is equal to $P's$ plus $P'a$, the output of slidewire 212(1C1) is $$\left(\frac{P's+P'a}{100}\right)\Delta G$$

The unit-requirement of unit 1C1 as computed by network 27(1C1) may now be expressed as Equation 13. Thus for this position of switches 206(C1) and 192(C1), the computer network 27(1C1) produces a unit-requirement which is the same as for Equation 12 although now the settings for participation in station-requirement and station-regulation are wholly independent.

For a graphic representation of basic concepts of the invention, reference is made to Figs. 9A–9D. As earlier discussed, Fig. 9A is a family of parallel curves illustrative of relationships between area-requirement, source generation and frequency. For purposes of the following discussion, the reciprocal of the slope of each of these curves expressed in megawatts of source generation per megawatt of area-requirement is defined as $$\frac{Ps+Pa}{100}$$

where $Ps$ is percent participation of the source in sustained-response and $Pa$ defines the percent participation of that source in area-assist action. The point Z of curve $Fn$ is defined by the source generation $Gn$ for zero area-requirement at normal frequency. The displacement of the $Fn$ curve in megawatts of source generation per 0.1 cycle for departures of frequency from normal (i. e., the relation between source generation and system frequency for a given area-requirement) is K, the source-frequency bias.

Figure 9B:
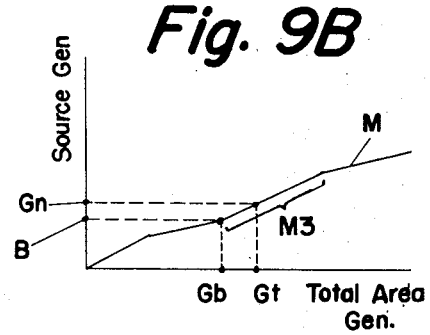

The curve M of Fig. 9B is illustrative of a programed assignment of generation desired of the source as a function of total area generation under the condition of normal frequency and zero area-requirement. As more fully discussed in my article "Area-Wide Generation Control" in the June-August 1953 issues of "Electric Light and Power," the program may consist of a series of connected segments. In Fig. 9B, the segment M3 to be considered embraces a value $Gt$ of total area generation. Its basepoint is B and its slope is $$\frac{Ps}{100}$$

the percent participation of the source in sustained-response. $Gn$ is the source generation demanded by the program for total generation $Gt$ for zero area-requirement and normal frequency. The slope of segment M3 may be expressed:

(14) $$\frac{Ps}{100}=\frac{Gn-B}{Gt-Gb}$$

where $Gb$=summation of source basepoints of the area.

The curve H (Fig. 9C) illustrates the relationship between system frequency and total area-generation prevailing for the present discussion. For normal frequency $Fn$, the total area-generation is $Gt$. For a given decrease ($\Delta F$) in frequency, the total area-generation is $Gte$ as defined by point W on curve H. The reciprocal (L) of the slope of curve H expressed in megawatts of total area-generation per 0.1 is given by

(15) $$L=-\left(\frac{Gte-Gt}{\Delta F}\right)$$

where L is the area bias as previously defined.

Figure 9C:
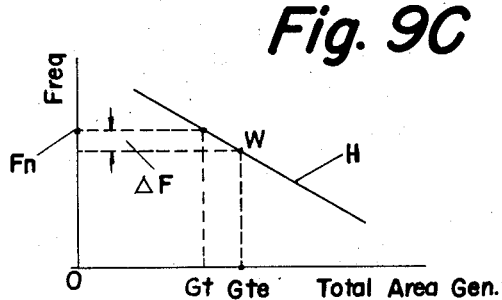
Figure 9D:
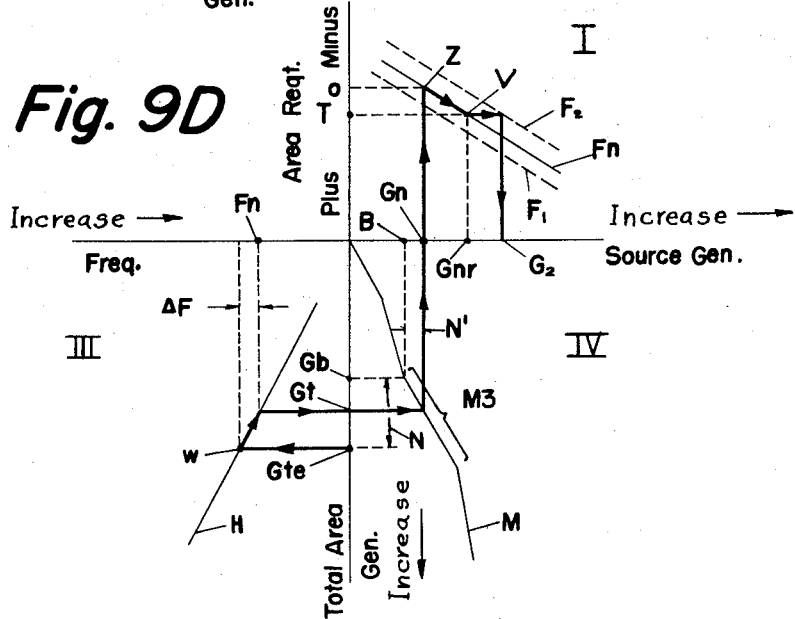

Fig. 9D is a composite figure having: in its first quadrant I a reproduction of curves $Fn$, F1, F2 of Fig. 9A; in its third quadrant III, a duplicate of curve H of Fig. 9C reproduced with frequency decreasing to the left and total area-generation increasing downwardly; and in its fourth quadrant IV, a reproduction of curve M of Fig. 9B rotated 90° in clockwise direction. Thus the curves $Fn$, F1, F3 and curve M share a common source generation coordinate, and curves H and M share a common total area-generation coordinate. The numerical value of $\Delta F$ is the same for the area-requirement/source generation curves of quadrant I and the frequency/total-generation curve of quadrant III. When the curves in quadrants I and III are properly located in relation to the common axes respectively shared with curve M of quadrant IV, Fig. 9D is illustrative of the computation of source-requirement (in this case a station) per Equation 8 and of the effect of control action thereon to reduce source-generation to zero. More particularly, assuming a total prevailing area generation of $Gte$, a prevailing minus deviation $\Delta F$ of system frequency, and a prevailing plus area-requirement T, Fig. 9D shows a graphic determination of the required source generation G2 such that the source will have assumed its programed share in sustained-response as established by curve M; will have assumed its assigned share, if any, of area-assist action as established by the relation of the slope of curve $Fn$ to the slope of curve M3; and will have increased its generation in response to the system frequency decrease as established by the displacement of curve F2 from curve $Fn$, said displacement either matching or replacing the natural governing characteristic of the source.

In Fig. 9D, the position of curve H is established by having its point W coincide with the intersection of the $Gte$ and $(Fn+\Delta F)$ coordinates. Remembering that curve H shows the total area-response to frequency deviation and that the source may share differently in the frequency-response than in the sustained-regulation, the area frequency-response generation should be subtracted from the prevailing area generation before sustained-response generation is assigned to the source per curve M3. Such subtraction is effected in Fig. 9D, as indicated by the heavy arrowed line, by projecting the total area-generation G$te$ onto curve H, moving along the curve to its F$n$ point, and then projecting back to total area generation ordinate to locate the point G$t$ whose magnitude may, by rewriting of Equation 15, be defined as:

(15A) $\qquad Gt = Gte + \Delta FL$ (NOTE: $\Delta F$ has minus sign for case being considered.)

Point G$t$ is projected onto curve M3 and thence to the source generation coordinate to locate point G$n$, the allocation of generation to the source exclusive of additional assignment for prevailing area-requirement (T) and frequency-deviation ($\Delta F$). The magnitude of generation G$n$, by rewriting of Equation 14, is defined as:

(16) $\qquad Gn = B + \frac{Ps}{100}(Gt - Gb)$

By substitution in Equation 16 of G$t$ as defined by Equation 15A, Equation 16 becomes (16A) $\qquad Gn = B + \frac{Ps}{100}(Gte + \Delta FL - Gb)$ which may be rewritten as:

(16B) $\qquad Gn = B + \frac{Ps}{100}(Gte - Gb) + \Delta F\left(\frac{PsL}{100}\right)$ But since ($Gte - Gb$) is area-regulation (N), Equation (16B) becomes (16C) $\qquad Gn = B + \frac{Ps}{100}(N) + \Delta F\left(\frac{PsL}{100}\right)$ The position of curve F$n$ is located in quadrant I of Fig. 9D by having its point Z coincide with the intersection of the G$n$ and the zero area-requirement coordinates. If the source is to have sustained-response only, the slope of curve F$n$ should match the slope of segment M3, i. e., $Pa = 0$. If in addition, it is to have an area-assist action, the slope of curve F$n$ depending upon the amount of area-assist action assigned to the source.

The additional assignment of generation to the source for the prevailing area-requirement T is made by projecting from G$n$ on the source-generation coordinate (Fig. 9D) to curve F$n$, moving along curve F$n$ to point V corresponding with area-requirement T, and defining G$nr$, the allocated generation of the source including its area-requirement component but exclusive of the frequency-deviation component. Where $Pa = 0$, there is no area-assist assignment included in the area-requirement component, which therefore provides only an anticipatory assignment of sustained-response. When $Pa > 0$, there is a corresponding area-assist assignment in the area-requirement component in addition to the anticipatory sustained-response.

As a step in defining the magnitude of G$nr$, an expression for the reciprocal of the slope of curve F$n$ may be written as:

(17) $\qquad \frac{Ps + Pa}{100} = \frac{Gnr - Gn}{T}$

Then solving the G$nr$:

(17A) $\qquad Gnr = Gn + \left(\frac{Ps + Pa}{100}\right)T$

By substitution in Equation 17A of G$n$, as defined in Equation 16C, Equation 17A becomes (17B)

$\qquad Gnr = B + \frac{Ps}{100}(N) + \left(\frac{Ps + Pa}{100}\right)T + \Delta F\left(\frac{PsL}{100}\right)$ The additional assignment to the source for the prevailing frequency-deviation $\Delta F$ is made by projecting from point V, corresponding with G$nr$ on the normal frequency F$n$ curve, along the coordinate for the prevailing area-requirement (T) to the F2 curve, and down to the source generation coordinate to define G2, the total assigned generation for the source under the initially assumed prevailing conditions.

As a step in defining the magnitude of G2, the displacement of curve F2 from F$n$ may be defined as:

(18) $\qquad G2 - Gnr = -K\Delta F$ (NOTE.—K, as previously defined, is source frequency-bias.)

By substitution in Equation 18 of G$nr$ as defined in Equation 17B, and solving for G2

(18A)

$\qquad G2 = B + \frac{Ps}{100}(N) + \left(\frac{Ps + Pa}{100}\right)T + \Delta F\left(\frac{PsL}{100} - K\Delta F\right)$ Combining the $\Delta F$ terms:

(18B)

$\qquad G2 = B + \frac{Ps}{100}(N) + \left(\frac{Ps + Pa}{100}\right)T - \Delta F\left(K - \frac{PsL}{100}\right)$ Thus G2 is the total generation assigned to the source for the prevailing conditions of total area-generation, area-requirement and system frequency. It is the total generation which the source must supply to reduce its requirement to zero. Returning to Equation 8 of which it was initially stated that Fig. 9D was illustrative, let the control action based on Equation 8 return the source-requirement $\Delta G$ to zero (as accomplished for example in Fig. 5): the achieved generation G of Equation 8 is identical with the assigned generation G2 of Equation 18B.

Thus it has been demonstrated that starting with any assumed or prevailing value of total area-generation G$te$, with any assumed or prevailing area-requirement T and frequency-deviation $\Delta F$, and with an assigned source sustained-response incremental-loading program based on such considerations as source availability, capability, incremental economy and incremental bus and delivered costs relative to costs from available alternative sources, and projecting to and along the curves of quadrants III, IV and I, Fig. 9D is a graphical representation of Equation 8 and is illustrative of the computation of total generation assigned to a source so that it provides its assigned share of sustained-response, its assigned area-assist generation and its assigned response to frequency-deviation.

A control system which achieves at each of two or more sources the total source generation assigned to each of them, in manner similar to Fig. 9D, is in fact an "area-governor." The quoted term is here applied to characterize a control system capable of recognizing, and effecting independently programed source control-response to, the many factors and variables which determine the optimum allocation of total generation among available alternative sources of the area to achieve operating economy and dependability of service while meeting customer demand.

In discussion of Fig. 9D, identity of its graphical representation with computation and control of a station source per Equation 8 was demonstrated. In similar manner, graphical representations of area governing may be made of the computations and control of the other mandatory station and unit source equations for which the source-requirements are returned to zero as with the control systems of Figs. 5, 6A, 6B. Such area-governing applied to unit sources, made possible by inclusion of the frequency-bias factors in mandatory executions with source output feedback, assigns to each source to which applied preset components of participation in total generation of the area, in any prevailing area-requirement, and in any prevailing frequency-deviation. Each generating unit so controlled is assigned a known, reproducible response to customer demand, area-requirement, and system frequency as contrasted with the response, frequently uncertain and non-reproducible, of conventional governors responsive only to speed. Application of such area-governing control to the many regulating sources of an area provides smooth cooperative participation of the sources in the overall regulation of the area.

In all of the computer control networks of Figs. 5, 6A, 6B, or their equivalents, the computation of total source-requirement is made essentially instantaneously and continuously. Thus in those arrangements in which there is assigned both sustained-response and area-assist action, the magnitudes of both of these assignments together with the other signals including the source frequency-bias factors appear in the computed total source-requirement substantially instantaneously. In an alternative computer network now to be described (Figs. 7, 8A, 8B) an instantaneous computation is made of the assigned area-assist action whereas the sustained-response is assigned on an integrated time-function basis.

The computer control system shown in Fig. 7 provides a predetermined programed participation by stations and units of an area in the sustained-response to the area's load changes and for area-assist action involves a frequency-bias factor in the computation of unit requirements. The sustained-response requirement of a unit is introduced on an integrated time-basis into a network for computation of the combined response requirement (sustained plus assist) of the unit. Into such network are also introduced signals respectively representative of a preselected percentage of the area-requirement, the selected frequency-bias of the unit, and the generation of the unit.

The portion of Fig. 7 to the left of line E—E is substantially identical with the portion of Fig. 3 to the left of line D—D. Since the corresponding elements of both are identified by similar reference numbers with additions of letters to identify the different stations and units, the corresponding portion of the description of Fig. 3 is applicable here and need not be repeated in full. As in the corresponding sections of Fig. 3, frequency-bias factors are not shown introduced in the computation of sustained-response requirements since the control action for sustained-response is permissive and the advantages of such introduction are not essential. They may, however, be introduced for higher accuracy of sustained-response computations and display.

As in the system of Fig. 3, the "Raise" or "Lower" pulses produced by the master controller 30D during existence of an area-requirement are transmitted to a particular generating unit of a station to effect a sustained-response only if permitted by the unit controller and the station controller, i. e., the control impulses are effective to change the generation of the unit only if its sustained unit-requirement and the requirement of its station are both unsatisfied and only if the control pulses are demanding a generation change of sense proper to correct such unsatisfied requirements.

However, unlike Fig. 3, the control impulses as transmitted for a generating unit do not directly change the generation as by directly controlling the governor position of the unit. As shown schematically in Fig. 7, these control pulses, when permitted to flow, for example for unit 1D1, by its unit sustained-requirement device 27(1D1) and station sustained-response device 219(D1), effect operation of reversible motor 226(1D1) to shift the sustained-response generation assignment (SRGA: Fig. 7) for unit 1D1 by adjustment of the network or device 224(1D1).

As now explained, the sustained-response generation assignment of the unit as established in this manner by permissive integrated time-control action is combined with a preselected percentage of the area-requirement for mandatory control of the generation of the unit. As schematically indicated in Fig. 7, the area-requirement signal is transmitted from the load dispatcher's office to the stations and at each station the area-assist action may be allocated among the individual generating units as exemplified in Fig. 7 by the blocks 221(1D1)—221(3D1).

For computing the combined requirement (sustained plus area-assist) for unit 1D1, the outputs of the percentage area-assist network 221(1D1), the sustained-response generation-assignment network 224(1D1), the unit frequency-bias network 225(1D1) and the unit-generation network 223(1D1) are effectively combined. The resultant output of comparator 222(1D1) as reproduced by device 227(1D1) is applied to controller 228(1D1) for changing the setting of the governor of unit 1D1, until the combined unit-requirement as computed by comparator 221(1D1) is reduced to zero: i. e., until the megawatt feedback signal from unit-generation output device 223(1D1) balances the concurrent algebraic sum of the signal from the sustained-response generation assignment device 224(1D1), from the percent participation area-assist device 221(1D1), and from the unit frequency-bias device 225(1D1). A signal corresponding with the governor position may be used as a feedback to controller 228(1D1) for improved controller performance during return of the output of comparator 221(1D1) to zero. Such feedback line is labeled "Gov. Motor Position" in Fig. 7.

The combined unit-requirement ($\Delta G'$) computed as above may be expressed:

(19) $\quad \Delta G' = (G's - G') + \dfrac{P'a}{100}(T) - \Delta F(K')$ where $G's$=sustained-response generation component.

It will be noted that Equation 19 is similar to Equation 5 of which it will be recalled that Fig. 9A was a graphical representation with B of Equation 5 corresponding to $Gn$ of Fig. 9A. Thus Fig. 9A is also illustrative of Equation 19 with $G's$ of Equation 19 corresponding with $Gn$ of Fig. 9A. There is, however, the following significant difference in the two equations. In Equation 5, B represents a fixed basepoint preset for a fixed sustained-response assignment for the source, whereas in Equation 19 $G's$ is a floating basepoint varied by permissive control action, as above described, to define a sustained-response generation assignment for the source, varying as the area load changes. With the control acting to return $\Delta G'$ of Equation 19 to zero, Fig. 9A defines the source output $G'$ (Equation 19) for any prevailing area-requirement ($T$) and frequency-deviation ($\Delta F$) when $Gn$ (source generation for zero area-requirement and normal frequency) is located in Fig. 9A to be equal to $G's$ of Equation 19. Source-generation changes for area-assist action and/or as response to frequency deviations then occur above and below $G's$ (the floating sustained-response generation assignment). The extent of the area-assist for any value of $G's$ is preset by device 221(1D1) and the response of the unit to frequency changes is determined by the setting of the unit-frequency bias in device 225(1D1) which may be set to match or replace the natural frequency-response characteristic of the unit. Again it is to be noted that the presence of the unit-bias factor serves to counterbalance the generation-response of the unit to remote load changes in the computation made by comparator 222(1D1).

The response of the unit may be limited to avoid excessively high or low generation, and/or to avoid excessive rate of change of generation, and/or to avoid exceeding limits of area-assist bands above and below the sustained-response assignment. In Fig. 7, this is schematically shown by the normally-closed switches 193, 229, 230 in series in the output circuit of controller 228(1D1) and respectively opened when the generation of unit 1D1 exceeds a predetermined high or low limit, when the generation rate of change of unit 1D1 exceeds a predetermined rate, and when the sustained requirement of unit 1D1 is to a predetermined extent above or below the sustained-response generation assignment.

It may be noted here that since the sustained-response is permissive, a change of any of the sustained basepoint or participation settings, of 12D1 or 15D1 at the load dispatcher's office or of 21(1D1) or 24(1D1) at the station, does not initiate a generation change at unit 1D1 in the absence of an area-requirement. It is also to be noted that this system differs from arrangements shown in Nichols et al. Patent 2,692,342 in that it involves utilization for individual units of a unit frequency-bias factor [225(1D1)] together with a unit output feedback factor [223(1D1)].

Figs. 8A, 8B illustrate a particular example of the computer-control system of Fig. 7 suited for automatic control of stations and units of generating area D. Fig. 8A illustrates the networks and devices which are disposed at the load dispatcher's office LDO of area D for determining the sustained-response requirements of stations of the area. Fig. 8B illustrates the networks and devices for determining the combined sustained-response and area-assist requirements of units of a typical station D1 of area D. In these figures, elements corresponding with those of other figures are identified by similar reference characters with the addition of identifying suffix or prefix.

The requirement of area D as computed by network 39D (Fig. 8A) is reproduced as a setting of slidewire 35 in the computer network 65D. In network 65D is also reproduced, as a setting of slidewire 67, the area-regulation contribution of the stations D1—D3. The area-regulation term is computed by network 70D as in systems previously herein described.

The network 85D1 for computing the station-requirement of station D1 includes the participation setter 12D1 whose output is a preselected percentage of the summation of area-requirement and area-regulation; the network 86D1 whose output is representative of the difference between the basepoint setting of station D1 and the generation of station D1; and the rebalancing network 87D1 whose slidewire 109 is adjusted by responsive device 13D1. The sustained-response station-requirement so computed is transmitted to station D1 as over a telemetering link including transmitter 112D1. Similar networks are provided for computing the sustained-response requirements of other stations of area D; such requirements may be similarly transmitted to those stations.

So long as the sustained-response requirement for station D1 as so computed is not zero, one or the other of switches 195, 196 is controlled by cam 197 of station-requirement device 13D1 to provide a path for transmission of "Raise" or "Lower" pulses from the master controller 30 to station D1. Such path is broken when station D1 has assumed its programed share of the existing generation required of the area even though such pulses may still be transmitted to other stations.

At station D1 (Fig. 8B), the telemetric receiver S113(D1) adjusts slidwire S114 so that the output of network S19 of computer network S117(D1) corresponds with the computed sustained-response requirement for station D1 as transmitted from the load dispatcher's office by transmitter 112(1D1). In network S117(D1) is also reproduced, as a setting of slidewire S119 of network S20, the station regulation of station D1. This term is computed by network 122(D1) as in previous systems.

Preselected percentages of the reference signal provided by combining the outputs of component networks S19, S20 of computer network S117(D1) are allocated by the participation setters S21(1D1)—S21(3D1) to the corresponding units of station D1 for control of their sustained response.

The computer network S27(1D1) for determining the sustained-response requirement of unit 1D1 includes the unit-participation slidewire S21(1D1), the network S137(1D1) whose output corresponds with the difference between the basepoint and the generation of unit 1D1, and the rebalancing network S138(1D1).

When the sustained-response requirement of unit 1D1 is not zero, the cam 200 of unit-requirement device S22(1D1) is displaced from its neutral position to close one or the other of switches 201, 202 for transmission of "Raise" or "Lower" pulses to motor 226(1D1) which shifts the setting of slidewire S24, thereby varying the floating reference base for the area-assist action of unit 1D1. This reference base is the sustained-response generation assignment ($\Delta G's$: Equation 19) for the unit. Until cam 200 is again in neutral position, the setting for the sustained-response generation assignment of unit 1D1 is slowly raised or lowered by motor 226(1D1), assuming that in the meantime neither the station-requirement nor the area-requirement has become zero or has reversed in sense.

Specifically, the motor 226(1D1) adjusts the slidwire S24 of network C37(1D1) and may so unbalance the computer network C27(1D1) to effect change in input for generating unit 1D1. To explain how this is accomplished and how the sustained-response generation assignment of unit 1D1 is combined with its area-assist requirement, it is desirable briefly to refer again to Fig. 8A.

At the load dispatcher's office, the area-requirement signal produced by network 39D is transmitted as by telemetering links including transmitter 207 to the various stations of area D. At station D1 (Fig. 8B), the area-requirement signal ($T$: Equation 19) as repeated by receiver 208 (D1) is reproduced in computer network A117(D1) by a change in setting of slidewire A114. A desired percentage ($Pa$: Equation 19) of this signal can be selected for the desired area-assist action of each of the units of station D1 by setting the participation slidewires A21(1D1)—A21(3D1) of the corresponding units.

The network C27(1D1) for computing the total requirement (sustained plus area-assist) [($\Delta G'$): Equation 19] of unit 1D1 includes its participation slidewire A21(1D1); the network C137(1D1) whose output depends upon the difference between the generation ($G'$: Equation 19) of unit 1D1 as represented by the position of slidewire C23 and the sustained-response generation-assignment ($G's$: Equation 19) of unit 1D1 as represented by the position of slidewire S24; the network C140 whose output depends upon the difference ($\Delta F$: Equation 19) between the normal scheduled frequency as represented by the setting of slidewire 153 and the actual frequency as represented by the position of slidewire 155, which output is multiplied by the unit frequency-bias setting ($K'$: Equation 19) of slidewire 158; and the rebalancing network C138 whose slidewire 159 is adjusted by the responsive device C22 to rebalance network C27(1D1) and to adjust the slidewire 162 of input network C164 of controller C28(1D1). The total requirement so computed is that defined by Equation 19.

Upon change in position of the aforesaid slidewire 162, the governor-motor 165 of unit 1D1 operates in the proper direction to change the generation of unit 1D1 in the sense demanded and continues to operate until the killowatt feedback from wattmeter 129(1D1), introduced by adjustment of slidewire C23 into network C27(1D1) and there combined with other concurrent signals, reduces $\Delta G'$ to zero. At that time, the unit generation ($G'$: Equation 19) of unit 1D1 has that magnitude required by the algebraic sum of the prevailing sustained-response assignment ($G's$: Equation 19), the required area-assist action $$\left(\frac{Pa}{100}T: \text{Equation } 19\right)$$

and the desired response to frequency-deviation ($\Delta FK'$: Equation 19).

The other generating unit or units of station D1, indicated as 2D1 and 3D1, may be similarly controlled.

The total generation of the units of station D1 is totalized by wattmeter 129D and transmitted to the load dispatcher's officie as by a telemetric link including transmitter 170(D1) and receiver 78(D1).

Is has so far been assumed, as illustrated in Fig. 9A, that the area-assist action was in linear proportion to the area-requirement. A non-linear relationship may be established, as for example in Fig. 8B, by grading or tapering the slidewire A114 in network A117(1D1). Specifically, a selected central portion of the slidewire may be of essentially zero resistance to delay area-assist action until the area-requirement reaches a predetermined magnitude in either sense.

In Fig. 8B as thus far described, whenever there is unbalance of computer network C27(1D1), control action from controller C28(1D1) is applied to unit 1D1 regardless of the prevailing level of generation of the unit, of the prevailing rate of change of its generation, or the prevailing extent of its area-assist action.

To disable the control when the unit generation becomes excessively high or excessively low, the corresponding one of the limit switches 193 is opened, as by wattmeter 129(1D1). As more fully described and claimed in my copending application Serial No. 693,589, it is desirable to confine the area-assist action to predetermined generation limits above and below its preset programed sustained-response assignment. To accomplish that objective for unit 1D1 in the system of Figs. 8A, 8B, the output circuit of controller C28(1D1) includes the normally closed switches 233, 234 which are selectively opened when the sustained-response requirement of unit 1D1 to predetermined extent is above or below its preset sustained-response program.

It may be desirable to suspend control action, because, for example, of limitations in steam generation or of the prime mover, when the rate of change of generation of a unit is in excess of a preset rate in either sense. That objective may be attained by various means exemplified in Fig. 8B by relay 236 whose normally closed contacts 230 are in the supply circuit of governor motor 165 and whose coil is energized from a differentiating network including resistance 238, capacitor 239 and a slidewire 240 adjusted by wattmeter 129(1D1) and supplied from a suitable direct-current source.

As set forth in my AIEE paper, 56-670, entitled "Some Aspects of Tie Line Bias Control of Interconnected Power Systems," the connected load of the area, as well as its generation, may vary with frequency. Also as discussed therein, the total bias set for the area in an area-requirement computing circuit (such as networks 39A–39D herein described) should be a composite including both the area-generation/frequency characteristic and the area-load/frequency characteristic in order that all of the power flow over tie lines toward, and resulting from change in load of, a remote area be compensated for in computation of area-requirement for the local area so that the area-requirement remains on zero for that condition.

However, in the computation of a source (station or unit) requirement, it is the generation response to frequency which is significant and hence whenever the percent area bias factor is introduced in a source-requirement computing circuit, as distinguished from an area-requirement computing circuit, it should be based on the area-generation/frequency characteristic and should not include the area-load/frequency characteristic.

In the source-requirement computing circuits herein described in which a percent area-frequency bias factor is introduced, such as $\dfrac{PL}{100}$ of Equation 2 and $\dfrac{PsL}{100}$ of Equation 8 the area-bias L in these factors is representative of area-generation/frequency characteristic and includes no area-load/frequency characteristic.

From the foregoing, it follows that if the area has a load/frequency characteristic, the setting of the "area-bias" slidewire 98 in the station-requirement computing network (exemplified by 85AI of Fig. 2A) should be lower than that of the "area-bias" set into the area-requirement computing network (39A of Fig. 2A). If as thus far described, with switch 32 closed, the area-bias for network 39A is set by a single slidewire 56, the setting should exceed that of slidewire 98 of the station-requirement computing network 85AI by the magnitude of the area-load/frequency characteristic. With switch 32 open, effectively to include a second slidewire 33 in series with the area-bias slidewire 56, the former may be set in accordance with the area-load/frequency component of the area bias and the latter set for the area-generation/frequency component of the area bias. So set, the slidewire 56 may be coupled, as schematically illustrated, for simultaneous adjustment with slidewire 98 whether or not the area has a load/frequency characteristic.

With slidewire 98 set for the area-generation/frequency characteristic only (whether or not linked to slidewire 57), the percent setting slidewire 12A1 and 84 may be linked for simultaneous setting.

The foregoing is also applicable to the station-requirement computer networks of other figures in which a percent area-frequency bias factor is introduced.

Also from the foregoing, if all stations of an area are under mandatory control of types herein described, the sum of the station-frequency bias settings would be equal to the total area-generation/frequency characteristic but less than the combined area-frequency bias characteristic by the magnitude of the area-load/frequency characteristic.

This application is in part a continuation of my aforesaid copending application Serial No. 344,838 to which reference may be had for discussion of "area-requirement" involving correction of time or of integrated deviation from schedule as well as maintenance of a frequency-biased scheduled interchange of power.

It shall also be understood that the invention is not limited to the particular exemplary arrangements described. For example, the computer networks disclosed are of the analog type using slidewire, but for them may be used other computers of the analog type or of the digital type. Also instead of using electrical computer devices employing electrical flow or pressure effects, there may be used, as in Phillips Patent 2,754,429, hydraulic or pneumatic devices employing liquid or gas pressure or flow effects.

It is also to be understood that the novel frequency-bias factors may be utilized for computation and/or control of the generation of interconnected stations and units in systems in which the programed share of the individual sources with respect to their total generation is a continuous curve rather than a series of straight-line segments (curve M of Fig. 9D) or in which the allocation of total generation among individual sources may be either on the basis of equal incremental costs of generation at the sources or on the basis of equal incremental costs of power delivered to the load.

It will be recalled that the several source computing networks above discussed provide means for computing source requirement, i. e. the change in generation required of the source to meet its assigned program, including its share of total prevailing generation, and its share, if any, in area assist action and response to frequency deviation. In some applications it will be desired to compute and display total desired source generation instead of, or in addition to, required change. The two are related thusly:

(20)     Source requirement $= \Delta G = Gd - G$ where Gd is desired source generation and G is prevailing source generation.

It is accordingly to be understood that omission of the source generation signal from the source requirement computing networks above described, will provide a computation of desired source generation which may be displayed. The source generation may then be introduced into an additional computing step in accordance with equation 20 for computation of the source requirement which, for applications involving mandatory control, would actuate a source controller in the manner already described, until computed source requirement is reduced to zero.

What is claimed is:

1. An arrangement for determining the generation requirements of individual generating sources of a group connected to a common distribution system and required to maintain a group schedule based on a frequency-biased interchange of power with said system comprising means for producing an effect varying as a function of the actual generation of an individual source, means for producing a second effect varying as a function of the generation change required of the group to correct the deviation from said schedule, means for producing a third effect varying as a function of the product of system frequency deviation times a frequency-bias factor assigned to the source, and means responsive to the algebraic summation of said effects, said algebraic summation corresponding with the generation change required of the individual source.

2. An arrangement as in claim 1 in which, for determination of the sustained-response requirement of an individual source, the second effect additionally varies as a function of group regulation, and in which the third effect additionally varies as a function of the product of system frequency deviation times a preset percent of the frequency-bias of the group.

3. An arrangement as in claim 1 in which, for determination of the group-assist requirement of an individual source, the second effect has no component varying as a function of group regulation, and in which the third effect has no component varying as a function of the frequency-bias of the group.

4. An arrangement as in claim 1 in which, for determination of the combined sustained-response and area-assist requirement of an individual source, the second effect varies as functions of generation-requirement of the group and regulation of the group, and in which the third effect varies as a function of the product of the system frequency deviation times the sum of a frequency-bias-factor assigned to the source and a preset fraction of the frequency-bias-factor assigned to the group.

5. An arrangement for determining the generation-requirement ($\Delta G$) of a generating source included in a group connected to a common distribution system and required to maintain a group schedule based on a frequency-biased interchange of power with the system comprising means for producing an effect related to the difference between the actual generation (G) of the source and its basepoint setting (B), means for producing a second effect related to a preset percentage (Ps) of the regulation (N) of the group, means for producing a third effect related to a preset percentage (Ps+Pa) of the generation requirement (T) of the group, means for producing a fourth effect related to the product of the system frequency deviation ($\Delta F$) times the algebraic sum of the assigned frequency-bias (K) of the source and a preset percentage (Ps) of the frequency-bias (L) of the group, and means responsive to the algebraic summation ($\Delta G$) of said effects where $$\Delta G = (B-G) + \frac{Ps}{100}(N) + \left(\frac{Ps+Pa}{100}\right)T - \Delta F\left(K - \frac{PsL}{100}\right)$$

in which $Pa$ = source percent participation in assist
$Ps$ = source percent participation in sustained-response 6. An arrangement as in claim 5 in which, for determination of the sustained-response generation-requirement of the source, the percent participation (Pa) in group assist is effectively preset to zero so that the algebraic summation ($\Delta G$) of said effects becomes:

$$\Delta G = (B-G) + \frac{Ps}{100}(N+T) - \Delta F\left(K - \frac{PsL}{100}\right)$$

7. An arrangement as in claim 5 in which, for determination of the group-assist generation requirement of the source, the percent participation (Ps) in the sustained-response requirement of the source is effectively preset to zero so that the algerbraic summation ($\Delta G$) of said effects becomes:

$$\Delta G = (B-G) + \left(\frac{Pa}{100}\right)T - \Delta FK$$

8. An arrangement as in claim 5 in which, for determination of the combined sustained-response and group-assist requirement of the source, the percent participation Ps and Pa are both preset to values greater than zero and with Pa not less than Ps.

9. An arrangement for determining the generation requirement ($\Delta G'$) of a generating unit included with others as one station of a group of stations in a generation area required to maintain an area schedule based on frequency-biased interchange of power with a power-distribution system including at least one other generating area comprising: means for producing an effect related to the difference between the actual generation (G') of the unit and its basepoint setting (B'), means for producing a second effect related to a preset percentage (P's) times the regulation (N') of the station, means for producing a third effect related to a preset percentage (P's+P'a) times the generation requirement ($\Delta G$) of the station, means for producing a fourth effect related to the product of the frequency deviation $\Delta F$ times the algebraic sum of the assigned frequency-bias (K') of the source and a preset percentage (P's) of the assigned frequency-bias (K) of the station, and means responsive to the algebraic summation of said effects ($\Delta G'$) where $$\Delta G' = (B'-G') + \left(\frac{P's}{100}\right)N' + \left(\frac{P's+P'a}{100}\right)\Delta G - \Delta F\left(K' - \frac{P's}{100}K\right)$$

in which
$P'a$ = unit percent participation in assist
$P's$ = unit percent participation in sustained-response.

10. An arrangement as in claim 9 in which, for determination of the sustained-response generation of the unit, the unit percent participation (P'a) in assist action at the station is effectively preset to zero so that the algebraic summation ($\Delta G'$) of said effects becomes $$\Delta G' = (B'-G') + \frac{P's}{100}(N' + \Delta G) - \Delta F\left(K' - \frac{P's}{100}K\right)$$

11. An arrangement as in claim 9 in which, for determination of the assist generation of the unit, the unit percent participation (P's) in the sustained-response of the station is effectively preset to zero so that the algebraic summation ($\Delta G'$) of said effects becomes $$\Delta G' = (B'-G') + \frac{P'a}{100}(\Delta G) - \Delta FK'$$

12. An arrangement for controlling the generation of stations of an area required to maintain an area schedule based on a frequency-biased interchange of power with at least one other generating area comprising means for assigning to individual stations a frequency-bias factor, means for assigning to individual stations a percentage participation in the area requirement, and means for controlling the generation of at least one of the individual stations to reduce to zero its respective generation requirement ($\Delta G$) as determined by the arrangement of claim 5.

13. A control arrangement as in claim 12 in which the control means for at least one of the stations reduces to zero its generation requirement (ΔG) as determined by the arrangement of claim 6.

14. A control arrangement as in claim 12 in which the control means for at least one of the stations reduces to zero its generation requirement (ΔG) as determined by claim 7.

15. A control arrangement in claim 12 in which the control means for at least one of the stations reduces to zero its generation requirement (ΔG) as determined by claim 8.

16. An arrangement for controlling the generation of generating units of a station included in an area required to maintain an area schedule based on a frequency-biased interchange of power with at least one other generating area comprising means for assigning to individual units a frequency-bias factor, means for assigning to individual units a percentage participation in the generation requirement of its station, and means for controlling the generation of at least one of the individual units to reduce to zero its respective generation requirement (ΔG') as determined by the arrangement of claim 9.

17. An arrangement as in claim 16 in which the control means for at least one of the units reduces to zero its generation requirement (ΔG') as determined by the arrangement of claim 10.

18. An arrangement as in claim 16 in which the control means for at least one of the units reduces to zero its generation requirement (ΔG') as determined by the arrangement of claim 11.

19. In a system for controlling the generation of a group of generation sources connected to a common distribution system and operating under a frequency-biased net-interchange schedule comprising means for producing a reference effect varying as a function of at least one of the conditions of group requirement and group regulation, means for presetting frequency-biases to the individual sources, and a plurality of computers for respectively determining the requirements of the individual generation sources; each of said computers comprising means for respectively producing effects respectively corresponding with a preset percentage of said reference effect, the difference between the basepoint and actual generation of the source, and a frequency-bias factor including at least the product of the existing frequency deviation times the preset frequency-bias of the source, and means responsive to the algebraic sum of said effects.

20. A system as in claim 19 in which the reference effect includes both group requirement and group regulation, and in which the frequency-bias factor additionally includes the product of the existing frequency deviation times a percent of the frequency-bias assigned to the group.

21. A system for controlling the generation of a group of generating sources connected to a common distributing system and operating under a schedule comprising means for producing a first effect varying as a function of the generation change required of the group to correct the deviation from said schedule, means for producing a second effect varying as a function of the generation of an individual source of the group, means for producing a third effect varying as a function of the product of frequency deviation and a frequency bias preset for said source, and means for deriving from the algebraic sum of at least said first, second and third effects a control effect corresponding with the generation change required of said source.

22. A system as in claim 21, including additional means for altering the input to said source until said control effect is reduced to zero.

23. A system for controlling the generation of a group of generating sources connected to a common distributing system and operating under a schedule comprising means for producing a first effect varying as a function of the total generation of the group, means for producing a second effect varying as a function of the generation of an individual source of the group, means for producing a third effect varying as a function of the product of frequency deviation and the algebraic sum of a frequency bias preset for said source, and a preset portion of a frequency bias preset for said group, and means for deriving from the algebraic sum of at least said first, second and third effects a control effect corresponding with the generation change required of said source.

24. A system for controlling the generation of a group of generating sources connected to a common distributing system and operating under a schedule comprising means for producing a first effect varying as a function of the algebraic sum of two components, the first component varying as a function of generation change required of the group to correct a deviation from said schedule, the second component varying as a function of the total generation of the group, means for producing a second effect varying as a function of the generation of an individual source of the group, means for producing a third effect varying as a function of the product of frequency deviation and the algebraic sum of a frequency bias preset for said source, and a preset portion of a frequency bias preset for said group, and means for deriving from the algebraic sum of at least said first, second and third effects a control effect corresponding with the generation change required of said source.

25. A system for controlling the generation of a group of generating sources connected to a common distributing system and operating under a schedule comprising means for producing a first effect varying as a function of the generation change required of the group to correct the deviation from said schedule, means for producing a second effect varying as a function of the generation of an individual source of the group, means for producing a third effect varying as a function of the product of frequency deviation and a frequency bias preset for said source, means for producing a fourth effect representative of a generation base point for said source, and means for deriving from the algebraic sum of at least said first, second, third and fourth effects a control effect corresponding with a generation change required of said source.

26. A system as in claim 25, in which means are provided to preset said base point to a fixed value.

27. A system as in claim 25, in which means are provided for varying said base point as a function of the total generation of the group.

28. A system for controlling the generation of a group of generating sources connected by at least one tie line to a power generating and distribution network and operating under a tie line schedule, including means for allocating to each of at least two sources of the group an individual composite control effect which is representative of the generation change required of that source so that it provides its programmed share of sustained response generation, its assigned share of group assist action, and its assigned response to system frequency deviations.

29. A system as in claim 28, in which means are provided to preset the programmed share of sustained response generation to a fixed magnitude.

30. A system as in claim 28, in which means are provided to vary the programmed share of sustained response generation as a function of the total group generation.

31. A system as in claim 28, including additional means for altering the input to each controlled source until its respective composite control effect is reduced to zero.

32. In a system for determining the desirable generations of a group of generating sources, network means comprising devices respectively adjustable to provide a correspondingly variable signal, means for adjusting each of said devices and of combining the variable signals, and generation allocation devices in number corresponding with said sources included in said network means and adjustable to derive from combinations of said variable signals individual composite signals for said sources, each respectively corresponding with the total generation required of each of said sources so that it will provide its programmed share of sustained response generation, its assigned share of group assist action, and its assigned participation in generation response to system frequency deviation.

33. An arrangement as in claim 1, which additionally includes exhibiting means for displaying said algebraic summation.

34. An arrangement for determining the generation desired of individual generating sources of a group connected to a common distribution system and required to maintain a group schedule based on a frequency-biased interchange of power with said system, comprising means for producing a first effect varying as a function of the generation change required of the group to correct the deviation from said schedule and additionally varying as a function of group regulation, means for producing a second effect varying as a function of the product of the system frequency deviation times the sum of a frequency-bias-factor assigned to the source and a preset fraction of the frequency-bias-factor assigned to the group, and means responsive to the algebraic summation of said effects, said algebraic summation corresponding with the generation desired from the individual source.

35. An arrangement as in claim 34 in which the first effect varies only as a function of the generation change required of the group to correct the deviation from said schedule, and in which the second effect varies only as a function of the product of the system frequency deviation times the frequency-bias-factor assigned to the source.

36. An arrangement as in claim 5 in which the first-named means produces an effect related only to the basepoint setting B whereby the algebraic summation of the said effect to which the last-named means is responsive becomes the desired generation $(G+\Delta G)$ where $$G+\Delta G = B + \frac{Ps}{100}(N) + \left(\frac{Ps+Pa}{100}\right)T - \Delta F\left(K - \frac{PsL}{100}\right)$$

37. An arrangement as in claim 36 which additionally includes exhibiting means for displaying said algebraic summation as the generation required of the source.

38. An arrangement as in claim 9 in which the first-named means produces an effect related only to the unit's basepoint setting (B'), whereby the algebraic summation of the said effects to which the last-named means is responsive becomes the desired unit generation $(G'+\Delta G')$ where $$G'+\Delta G' = B' + \left(\frac{P's}{100}\right)N' + \left(\frac{P's+P'a}{100}\right)\Delta G - \Delta F\left(K' - \frac{P'sK}{100}\right)$$

39. An arrangement as in claim 38 which additionally includes exhibiting means for displaying said algebraic summation as the generation required of the unit.

40. In a system for controlling generation of sources of an area wherein the desired total generation of said sources is allocated among them on the basis of equal incremental costs, means for producing an area signal related to the total desired generation of said sources, means for deriving from said area-signal source signals which are individual to said sources and representative of their respective desired generations, means for producing source signals respectively varying as a function of the actual generation of the individual sources, means for producing source signals respectively varying as a function of the product of frequency deviation and a frequency-bias preset for the individual sources, and means for deriving from the algebraic summation of the source signals individual to the sources effects which respectively correspond with the generation changes required of the individual sources.

41. An arrangement as in claim 40 additionally including exhibiting means respectively responsive to said effects for displaying the generation changes required of the individual sources.

42. An arrangement as in claim 40 additionally including control means respectively responsive to said effects for correspondingly changing the actual generation of the individual sources.

43. A system for control of the output from an electric power generator interconnected with other electric power generators to form a group, comprising means for producing a first signal common to said group for use in the determination of the generation desired at normal frequency from each of said generators, means for producing from said first signal a second signal representative of the output desired from said generator at normal frequency, means for producing a third signal representative of the actual output from said generator frequency-responsive means for producing a fourth signal having a proportionate relationship to the deviation of frequency from normal and representative of the desired change in output from said generator corresponding with said deviation, and control means responsive to the algebraic sum of said second, third and fourth signals to vary the actual output from said generator to reduce said sum to zero whereby, during frequency deviation from normal, said actual output of said generator deviates from said desired generation to extent predetermined by said frequency-responsive means.

44. A control system as in claim 43 in which the generator has a natural characteristic response to frequency wherein a change of frequency is accompanied by change in actual output of the generator independently of said control means, and in which the frequency-responsive means of claim 43 includes means adjustable to set said proportionate relationship to match said natural characteristic response of the generator or to establish an imposed characteristic response of the generator whereby, during frequency deviation from normal, the actual output of said generator as controlled by said control means deviates from the output desired at normal frequency to extent predetermined by the setting of said adjustable means.

45. In an operating area of a power-distribution network, a system for control of the output of a generating unit interconnected with other generating units to form a group, said generating unit having a natural characteristic response to area frequency wherein a change in frequency is accompanied by change in output of said generating unit, comprising means for producing a signal common to said group for use in determination of the generation desired from each of the generating units of the group, which signal is unaffected by changes in area frequency which do not impose a generation change requirement on said group of units, means for deriving from said common signal a unit signal representative of the output required of said generating unit to carry a programmed share of the area load at normal frequency, means for producing a unit signal representative of the actual output of said generating unit, frequency-responsive means for producing a unit signal representative of the change in output of said generating unit desired for the prevailing deviation of said frequency from normal, and control means responsive to the algebraic summation of said unit signals to vary the output of said generating unit to reduce said sum to zero, whereby, during deviation of said frequency from normal, the actual output of said generating unit deviates from its said programmed share to extent determined by said frequency-responsive means rather than by said natural characteristic response of said generating unit.

No references cited.

UNITED STATES PATENT OFFICE
Certificate of Correction

Patent No. 2,866,102                                                             December 23, 1958

Nathan Cohn

It is hereby certified that error appears in the printed specification of the above numbered patent requiring correction and that the said Letters Patent should read as corrected below.

Column 2, line 42, for "distributing" read —distribution—; line 57, for "setting" read —settings—; column 5, line 70, for "21(TA1)" read —21(2A1)—; column 7, line 9, for "exits" read —exists—; line 31, for "partcular" read —particular—; column 9, line 30, after "A1—A3" insert —to—; column 10, lines 10 to 12, the equation should appear as shown below instead of as in the patent—

$$\left[ \Delta F\left(\frac{P}{100}L\right); \text{ Equation 2} \right]$$

column 11, line 42, for "adidtion" read —addition—; column 15, line 57, for "is modified" read —as modified—; column 16, line 21, for "13Z5" read —13B5—; column 20, line 30, for "(P'a;" read —(Pa';—; column 20, lines 38, 54, and 58, for "($\Delta$G'a;", each occurrence, read —($\Delta$Ga';—; column 21, line 5, for "$\Delta$G'a" read —$\Delta$Ga'—; column 22, line 61, for "regulaion" read —regulation—; column 23, line 73, Equation (11A), for "200" in the numerator of the quantity enclosed in parentheses read —100—; column 29, line 40, after "Fn" insert —will be shallower than that of segment M3 to extent—; line 63, for "the Gnr" read —for Gnr—; column 33, line 30, for "The" read —This—; column 34, line 18, for "slidwire" read —slidewire—; line 19, for "C37(1D1)" read —C137(1D1)—; column 35, line 2, for "129D" read —129D1—; column 40, line 5, for "alegbraic" read —algebraic—.

Signed and sealed this 15th day of March 1960.

[SEAL]

Attest:
KARL H. AXLINE,
*Attesting Officer.*

ROBERT C. WATSON,
                                                                                  *Commissioner of Patents.*